US011259208B2

United States Patent
Kim et al.

(10) Patent No.: US 11,259,208 B2
(45) Date of Patent: Feb. 22, 2022

(54) OVERLOAD CONTROL METHOD IN WIRELESS COMMUNICATION SYSTEM AND DEVICE FOR SAME

(71) Applicant: LG ELECTRONICS INC., Seoul (KR)

(72) Inventors: Taehun Kim, Seoul (KR); Jaehyun Kim, Seoul (KR); Jinsook Ryu, Seoul (KR); Hyunjung Choe, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 115 days.

(21) Appl. No.: 16/620,455

(22) PCT Filed: Jun. 8, 2018

(86) PCT No.: PCT/KR2018/006551
§ 371 (c)(1),
(2) Date: Dec. 6, 2019

(87) PCT Pub. No.: WO2018/226072
PCT Pub. Date: Dec. 13, 2018

(65) Prior Publication Data
US 2021/0084528 A1    Mar. 18, 2021

Related U.S. Application Data

(60) Provisional application No. 62/517,142, filed on Jun. 8, 2017.

(51) Int. Cl.
*H04L 12/927* (2013.01)
*H04W 28/02* (2009.01)
(Continued)

(52) U.S. Cl.
CPC ....... *H04W 28/0289* (2013.01); *H04W 76/27* (2018.02); *H04W 76/30* (2018.02)

(58) Field of Classification Search
None
See application file for complete search history.

(56) References Cited

U.S. PATENT DOCUMENTS

| 9,295,088 B2 | 3/2016 | Lee et al. |
| 2010/0165940 A1 | 7/2010 | Watfa et al. |

(Continued)

FOREIGN PATENT DOCUMENTS

WO    2017018838    2/2017

OTHER PUBLICATIONS

PCT International Application No. PCT/KR2018/006551, International Search Report dated Jan. 4, 2019, 3 pages.

*Primary Examiner* — Sithu Ko
(74) *Attorney, Agent, or Firm* — Lee Hong Degerman Kang Waimey

(57) ABSTRACT

Disclosed are an overload control method in a wireless communication system and a device for the same. Specifically, a method by which a base station performs an overload control in a wireless communication system can include: a step of receiving an overload start message from a core network; a step of receiving a first radio resource control (RRC) message including a non-access stratum (NAS) message from user equipment (UE); and a step of transmitting an RRC connection release message, for instructing the release of an RRC connection, to the UE when an instruction for instructing data transmission through a control plane in the first RRC message is included.

14 Claims, 11 Drawing Sheets

(51) Int. Cl.
*H04W 76/30* (2018.01)
*H04W 76/27* (2018.01)

(56) References Cited

U.S. PATENT DOCUMENTS

| | | |
|---|---|---|
| 2016/0007388 A1 | 1/2016 | Ianev et al. |
| 2016/0366607 A1 | 12/2016 | Zhang et al. |
| 2018/0027479 A1* | 1/2018 | Ahmad ................. H04W 48/12 370/235 |
| 2018/0084590 A1* | 3/2018 | Ianev ................ H04W 72/0493 |
| 2018/0098240 A1* | 4/2018 | Griot ................ H04W 28/0247 |
| 2018/0376531 A1* | 12/2018 | Martinez Tarradell ...................... H04W 76/10 |
| 2019/0007983 A1* | 1/2019 | Xiao ........................ H04W 8/02 |
| 2019/0246334 A1* | 8/2019 | Wang .................... H04W 48/08 |
| 2019/0274089 A1* | 9/2019 | Castmo ................ H04W 48/02 |
| 2020/0092425 A1* | 3/2020 | Hietalahti ............. H04W 60/04 |
| 2020/0267616 A1* | 8/2020 | Watfa .................. H04W 36/385 |
| 2021/0243648 A1* | 8/2021 | Liu ......................... H04W 4/70 |

\* cited by examiner

[Figure 1]
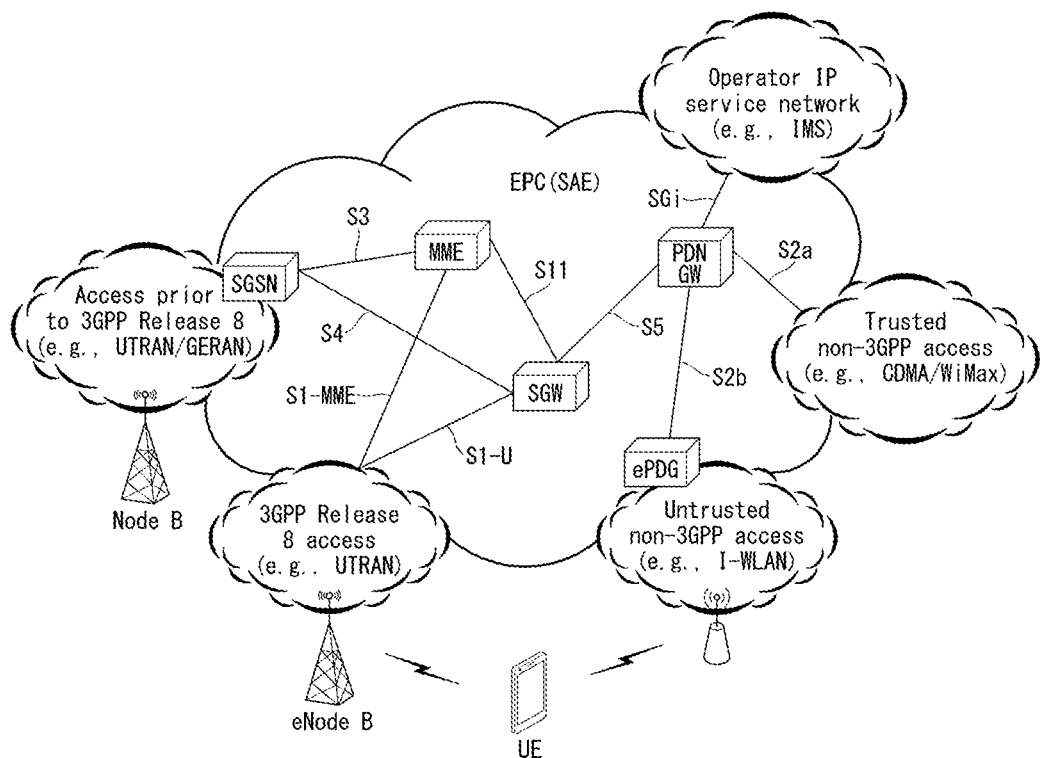

【Figure 2】
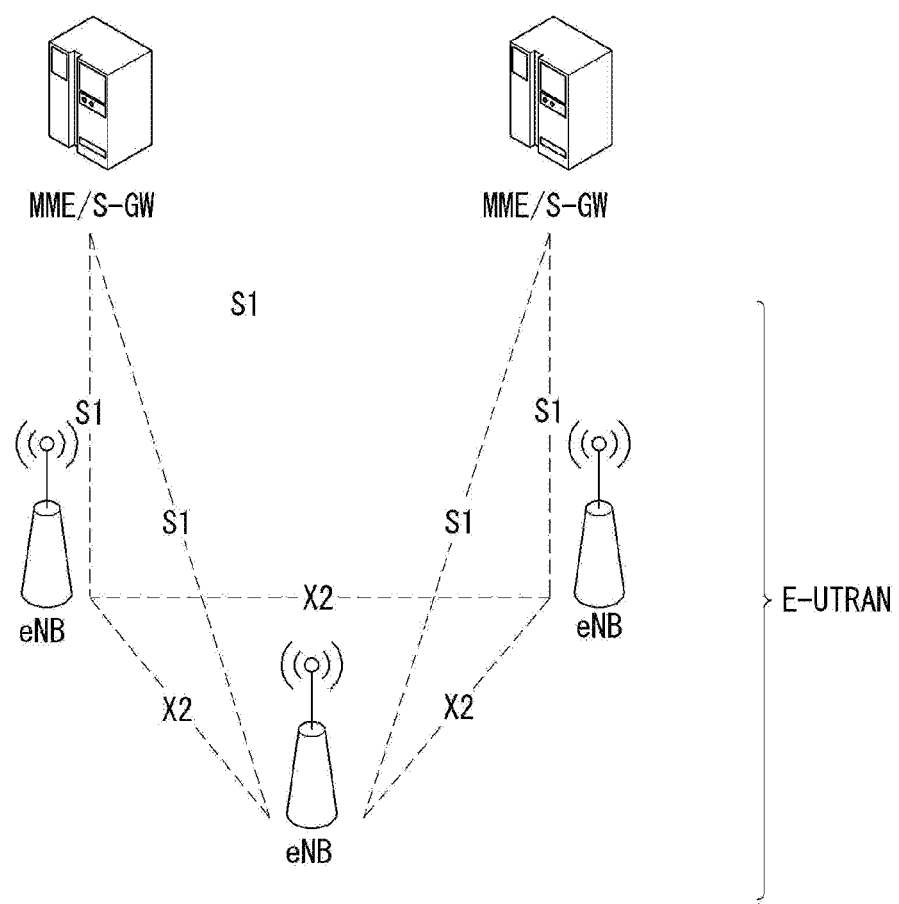

【Figure 3】
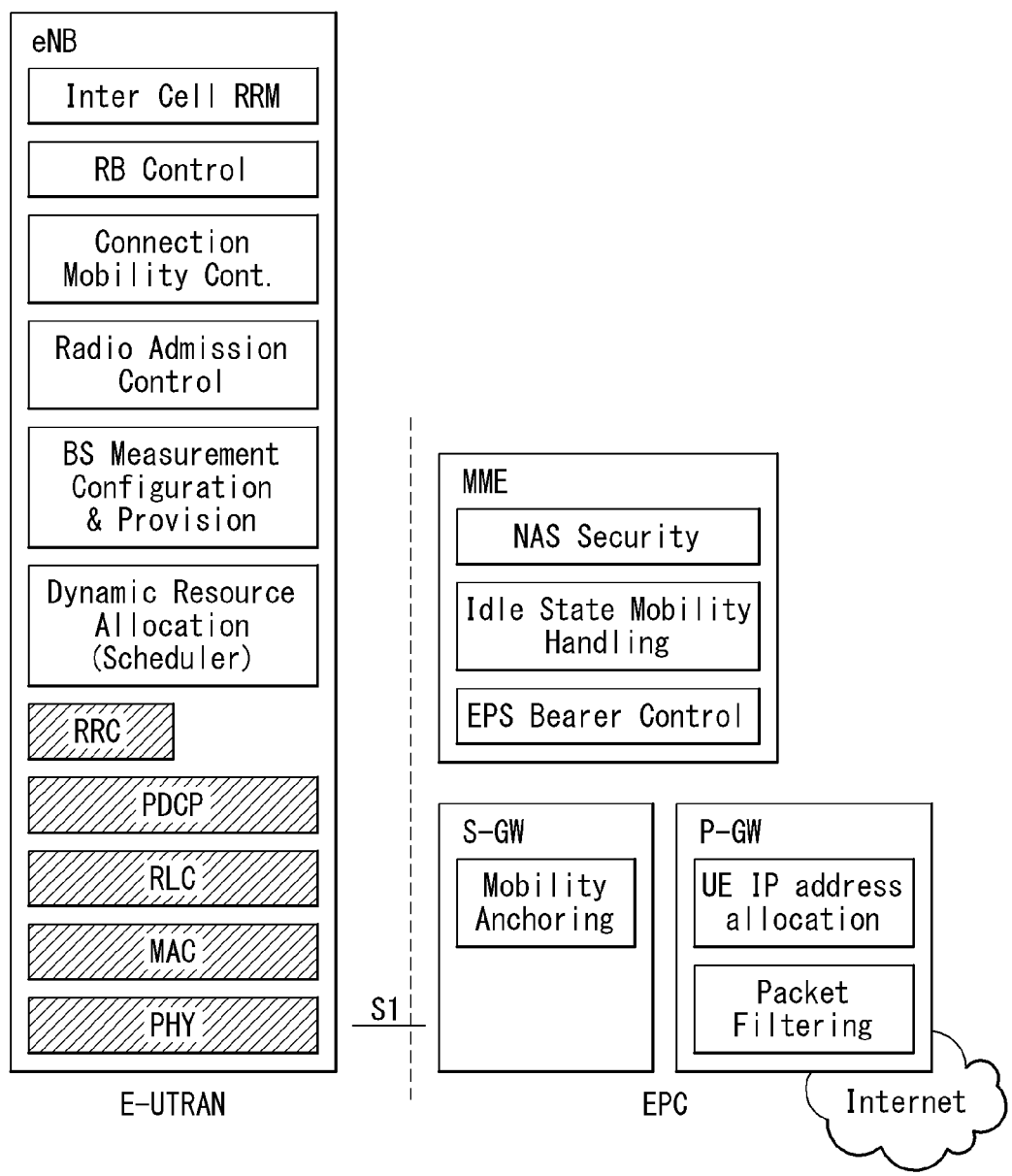

【Figure 4】
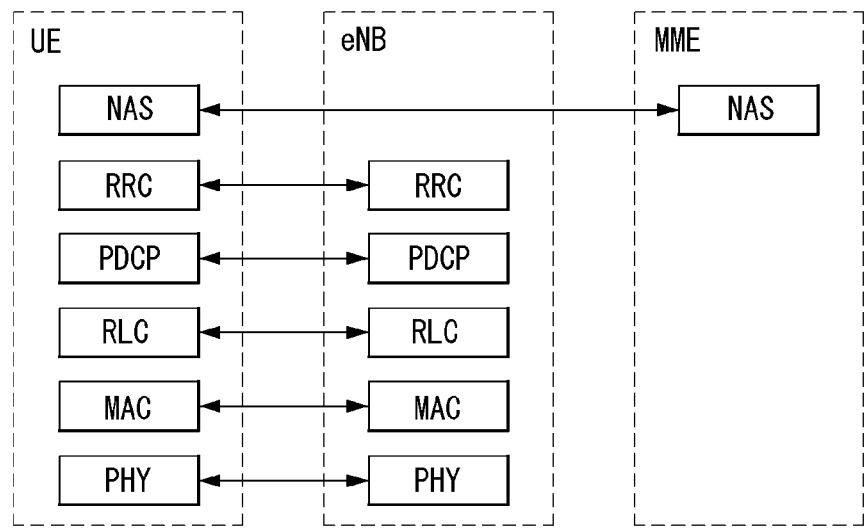
(a) Control plane protocol stack
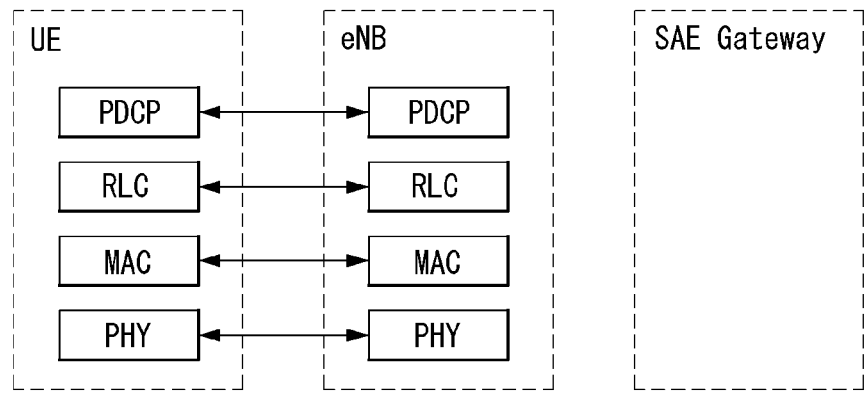
(b) User plane protocol stack 【Figure 5】
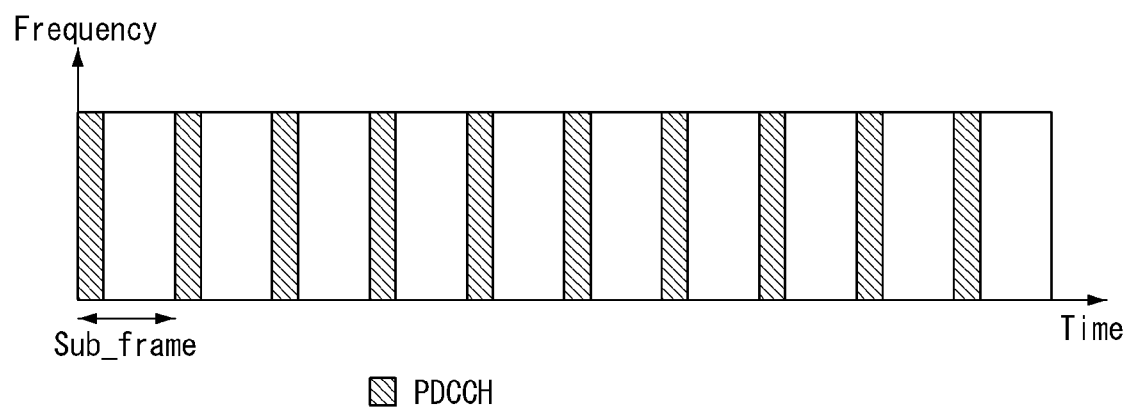
【Figure 6】
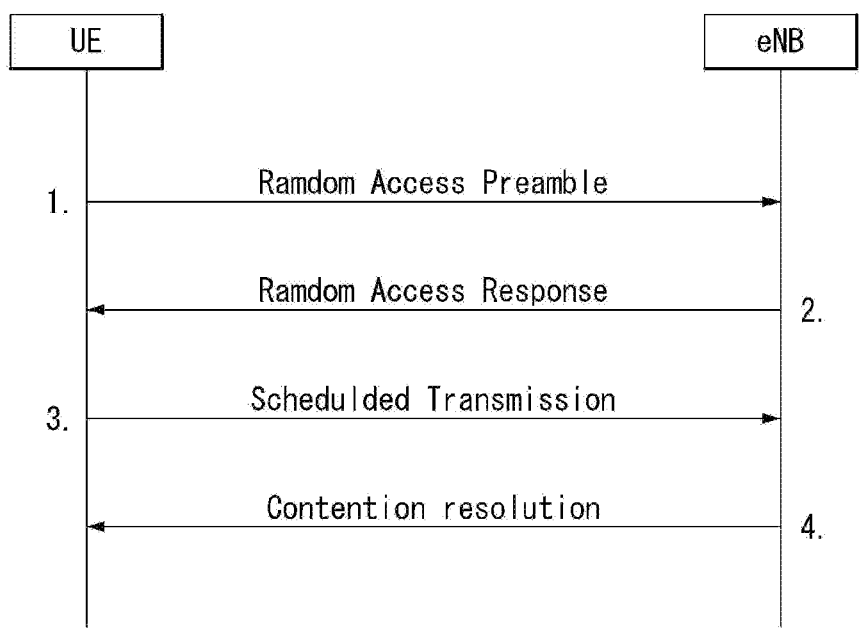

【Figure 7】
【Figure 8】

【Figure 9】
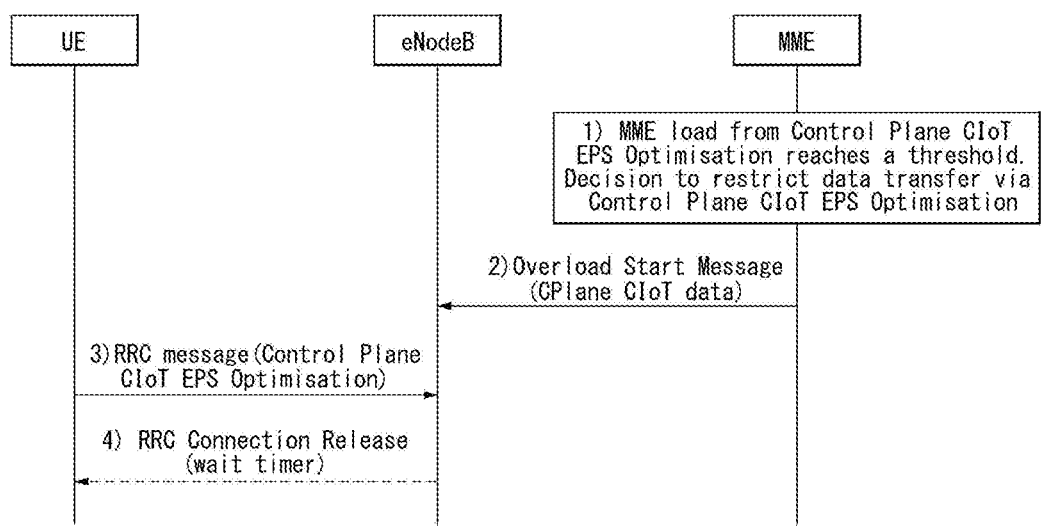

[Figure 10]
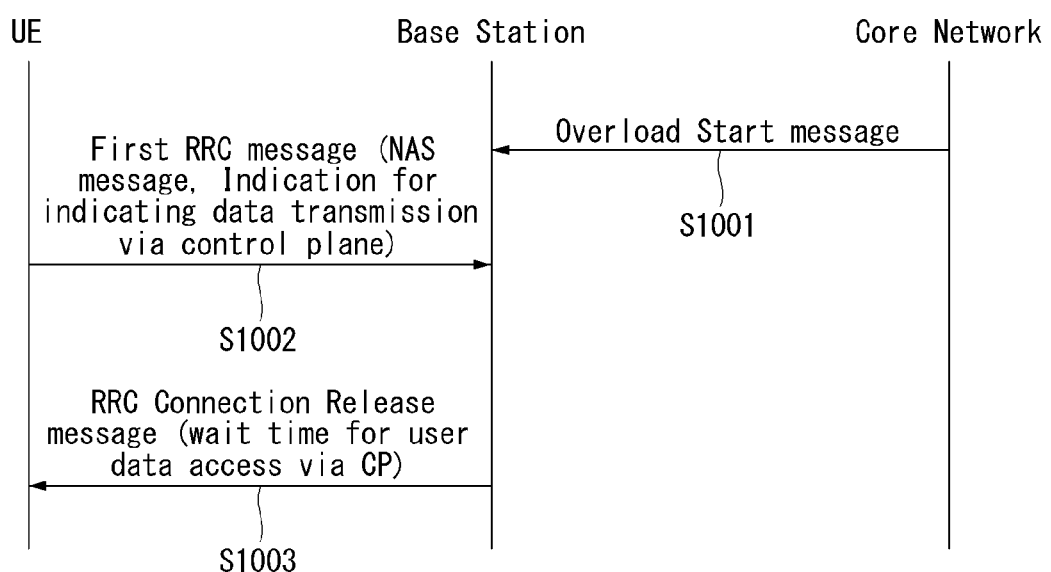

[Figure 11]
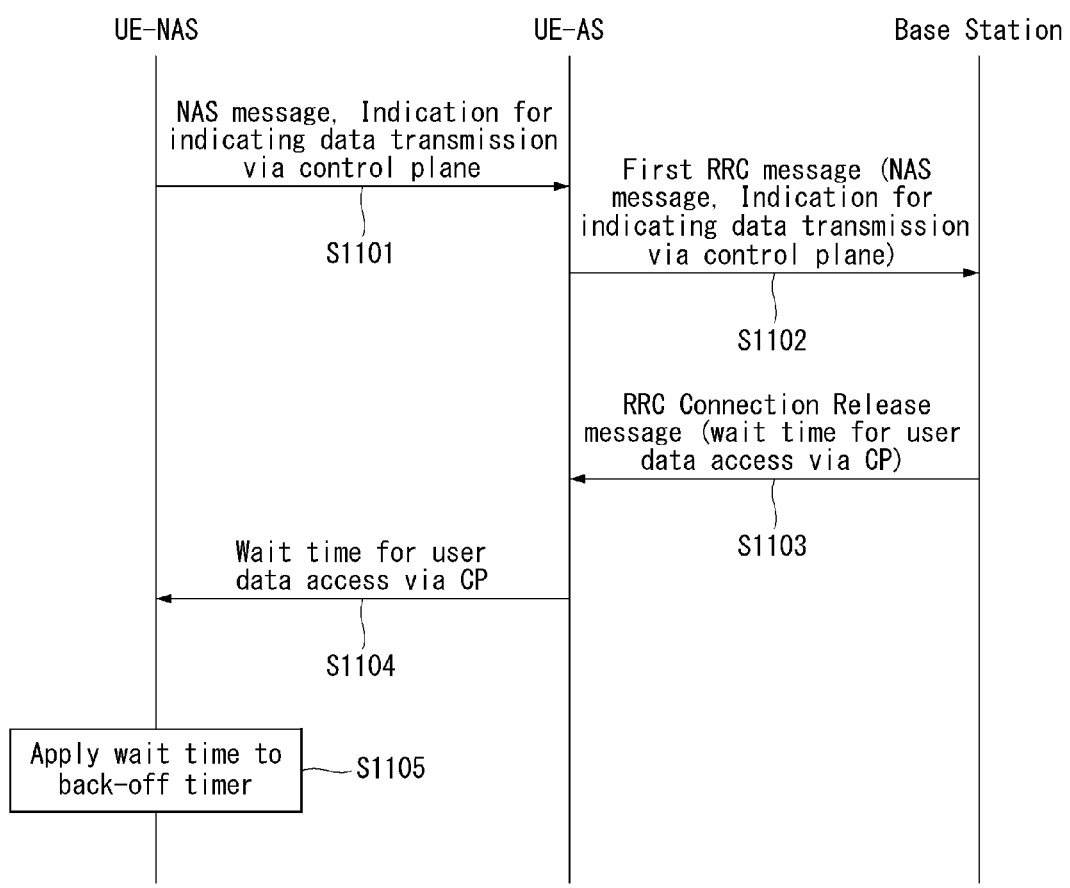

[Figure 12]
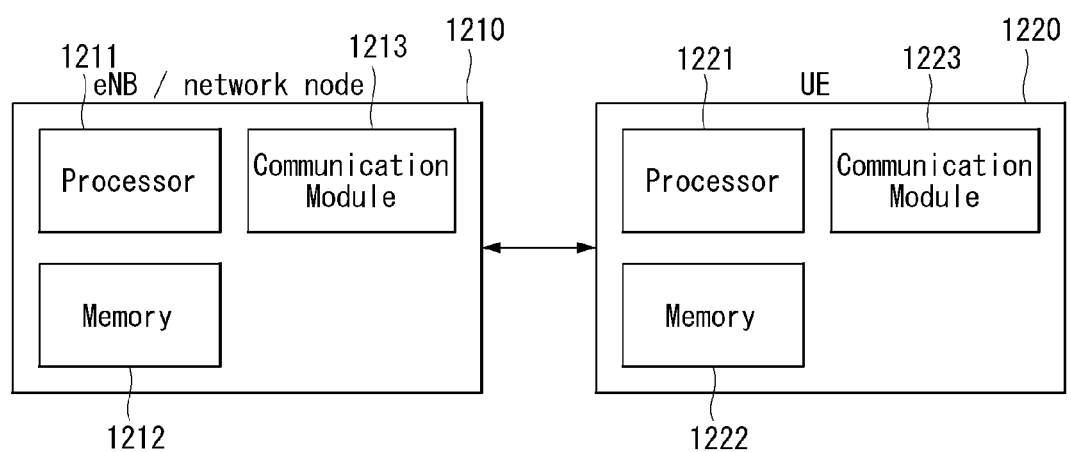

【Figure 13】
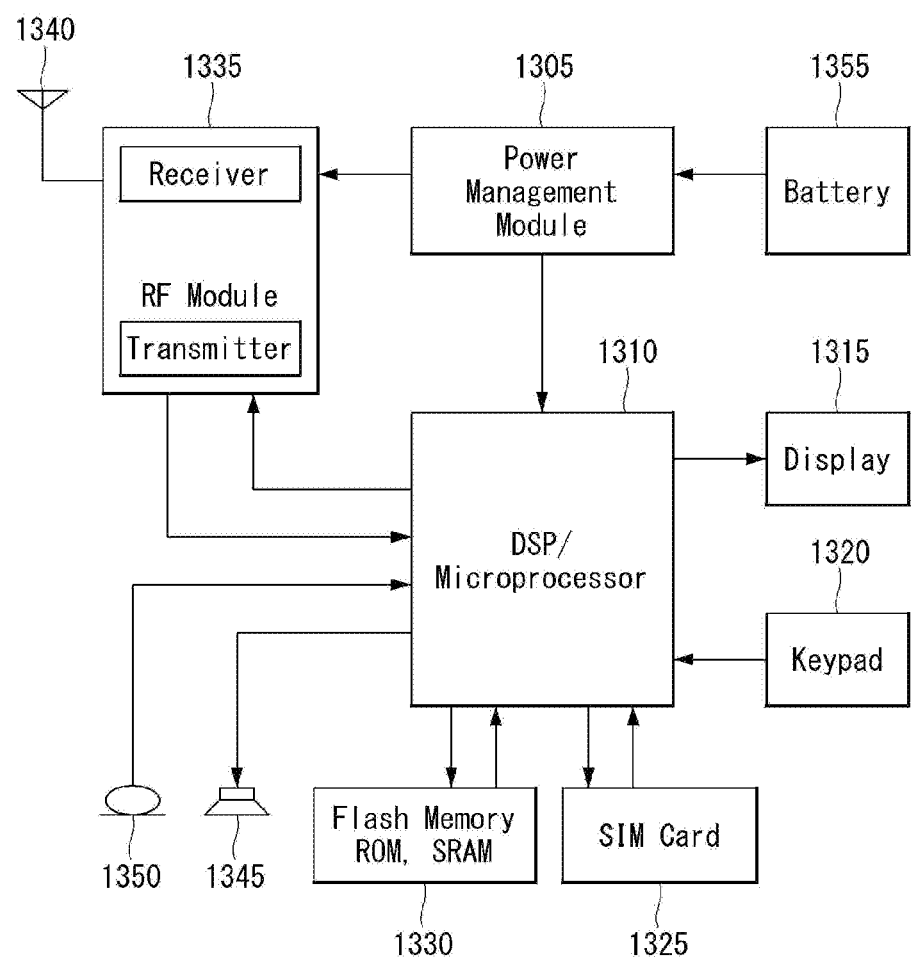

001
OVERLOAD CONTROL METHOD IN WIRELESS COMMUNICATION SYSTEM AND DEVICE FOR SAME

CROSS-REFERENCE TO RELATED APPLICATIONS

This application is the National Stage filing under 35 U.S.C. 371 of International Application No. PCT/KR2018/006551, filed on Jun. 8, 2018, which claims the benefit of U.S. Provisional Application No. 62/517,142, filed on Jun. 8, 2017, the contents of which are all hereby incorporated by reference herein in their entirety.

TECHNICAL FIELD

The present disclosure relates to a wireless communication system, and more particularly to a method for performing/supporting an overload control and a device supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present disclosure is to propose a method for performing a control plane overload control of a core network.

Technical problems to be solved by the present disclosure are not limited by the technical problems mentioned above, and other technical problems which are not mentioned above can be clearly understood from the following description by a person having ordinary skill in the art to which the present disclosure pertains.

Technical Solution

One general aspect of the present disclosure comprises a method for performing, by a base station, an overload control in a wireless communication system, the method comprising: receiving from a core network an overload start message; receiving from a user equipment (UE) a first radio resource control (RRC) message with a non-access stratum (NAS) message; and based on an indication for indicating a data transmission via a control plane (CP) included in the first RRC message, sending to the UE a RRC connection release message for commanding a release of a RRC connection.

The method may further comprise, receiving from the UE a second RRC message with a RRC establishment cause, and the RRC establishment cause may be mobile originated (MO) data or mo-signalling or delayTolerantAccess.

The RRC connection release message may include a wait time for a user data access via the control plane.

The indication may use an indication of requesting the use of CP Cellular Internet of Things (IoT) (CIoT) evolved packet system (EPS) optimization only.

Based on the UE being a UE using narrowband (NB)-IoT radio access technology (RAT), the indication of requesting the use of the CIoT EPS optimization may be used.

Based on the indication being a data transmission via control plane CIoT EPS optimization, the indication may be considered as a data transmission via control plane CIoT EPS optimization together with a request for the use of control plane CIoT EPS optimization.

The NAS message may be a control plane service request (CPSR) message with MO data or a tracking area update (TAU) request message with a signaling active flag.

Another general aspect of the present disclosure comprises a method for operating a user equipment (UE) for an overload control in a wireless communication system, the method comprising: passing, by a non-access stratum (NAS) layer, an indication for indicating a data transmission via a control plane (CP) and a NAS message to an access stratum (AS) layer; sending, by the AS layer, a first radio resource control (RRC) message including the indication and the NAS message to a base station; based on the AS layer receiving from the base station a RRC connection release message with a wait time for a user data access via the control plane, passing the wait time to the NAS layer; and applying, by the NAS layer, the wait time to a back-off timer.

The method may further comprise, sending, by the AS layer, a second RRC message with a RRC establishment cause to the base station, and the RRC establishment cause may be mobile originated (MO) data or delayTolerantAccess.

The indication may use an indication of requesting the use of CP Cellular Internet of Things (IoT) (CIoT) evolved packet system (EPS) optimization only.

Based on the UE being a UE using narrowband (NB)-IoT radio access technology (RAT), the indication of requesting the use of the CIoT EPS optimization may be used.

The NAS message may be a control plane service request (CPSR) message with MO data or a tracking area update (TAU) request message with a signaling active flag.

Advantageous Effects

Embodiments of the present disclosure can efficiently reduce a control plane overload of a core network.

Embodiments of the present disclosure can efficiently reduce only an overload of a control plane by blocking only data transmission via the control plane of a UE and not blocking data transmission, etc. via a user plane other than the control plane.

Effects obtainable from the present disclosure are not limited by the effects mentioned above, and other effects which are not mentioned above can be clearly understood from the following description by a person having ordinary skill in the art to which the present disclosure pertains.

DESCRIPTION OF DRAWINGS

The accompanying drawings, that are included to provide a further understanding of the present disclosure and are incorporated in and constitute a part of this specification, illustrate embodiments of the present disclosure and together with the description serve to explain various principles of the present disclosure.

FIG. 1 schematically illustrates an evolved packet system (EPS) to which the present disclosure is applicable.

FIG. 2 illustrates an example of a structure of an evolved universal terrestrial radio access network (E-UTRAN) to which the present disclosure is applicable.

FIG. 3 exemplifies a structure of E-UTRAN and EPC in a wireless communication system to which the present disclosure is applicable.

FIG. 4 illustrates a structure of a radio interface protocol between a UE and E-UTRAN in a wireless communication system to which the present disclosure is applicable.

FIG. 5 schematically illustrates a structure of a physical channel in a wireless communication system to which the present disclosure is applicable.

FIG. 6 illustrates a contention based random access procedure in a wireless communication system to which the present disclosure is applicable.

FIG. 7 illustrates an overload start procedure in a wireless communication system to which the present disclosure is applicable.

FIG. 8 illustrates an overload stop procedure in a wireless communication system to which the present disclosure is applicable.

FIG. 9 illustrates a procedure of an overload start message for data transmission via a control plane in a wireless communication system to which the present disclosure is applicable.

FIG. 10 illustrates an overload control method according to an embodiment of the present disclosure.

FIG. 11 illustrates an overload control method according to an embodiment of the present disclosure.

FIG. 12 illustrates a block configuration diagram of a communication device according to an embodiment of the present disclosure.

FIG. 13 illustrates a block configuration diagram of a communication device according to an embodiment of the present disclosure.

MODE FOR INVENTION

In what follows, preferred embodiments according to the present disclosure will be described in detail with reference to appended drawings. The detailed descriptions provided below together with appended drawings are intended only to explain illustrative embodiments of the present disclosure, which should not be regarded as the sole embodiments of the present disclosure. The detailed descriptions below include specific information to provide complete understanding of the present disclosure. However, those skilled in the art will be able to comprehend that the present disclosure may be embodied without the specific information.

For some cases, to avoid obscuring the technical principles of the present disclosure, structures and devices well-known to the public may be omitted or may be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE may be performed by the base station or by network nodes other than the base station. The term Base Station (BS) may be replaced with a fixed station, Node B, evolved-NodeB (eNB), Base Transceiver System (BTS), or Access Point (AP). Also, a terminal may be fixed or mobile; and the term may be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

Specific terms used in the following descriptions are introduced to help understanding the present disclosure, and the specific terms may be used in different ways as long as it does not leave the technical scope of the present disclosure.

The technology described below may be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA may be implemented by such radio technology as Universal Terrestrial Radio Access (UTRA) or CDMA2000. TDMA may be implemented by such radio technology as Global System for Mobile communications (GSM), General Packet Radio Service (GPRS), or Enhanced Data rates for GSM Evolution (EDGE). OFDMA may be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present disclosure may be supported by standard documents disclosed in at least one of wireless access systems including the IEEE 802, 3GPP, and 3GPP2 specifications. In other words, among the embodiments of the present disclosure, those steps or parts omitted for the purpose of clearly describing technical principles of the present disclosure may be supported by the documents above. Also, all of the terms disclosed in this document may be explained with reference to the standard documents.

To clarify the descriptions, this document is based on the 3GPP LTE/LTE-A, but the technical features of the present disclosure are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE may be called a terminal, Mobile Equipment (ME), or Mobile Station (MS). A UE may be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS may perform functions of configuration storage, identity management, user state storage, and so on.

Public Land Mobile Network (PLMN): a network formed to provide mobile communication services to individuals. The PLMN may be formed separately for each operator.

In what follows, the present disclosure will be described based on the terms defined above.

Overview of System to which the Present Disclosure is Applicable

FIG. 1 illustrates an Evolved Packet System (EPS) to which the present disclosure is applicable.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities may be established through an IP-based base station (for example, eNodeB), EPC, and application domain (for example, IMS). In other words, the EPC provides the architecture essential for implementing end-to-end IP services.

The EPC includes various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, if UE moves across serving areas by the eNodeB, the SGW acts as an anchor point for local mobility. In other words, packets may be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW may support policy enforcement features, packet filtering, charging support, and so on. Also, the PDN GW may act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways may be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability may access the IP service network (for example, the IMS) that a service provider (namely, an operator) provides, via various components within the EPC based not only on the 3GPP access but also on the non-3GPP access.

Also, FIG. 1 illustrates various reference points (e.g., S1-U, S1-MME, etc.). The 3GPP system defines a reference point as a conceptual link which connects two functions defined in disparate functional entities of the E-UTAN and the EPC. Table 1 below summarizes reference points illustrated in FIG. 1. In addition to the examples of FIG. 1, various other reference points may be defined according to network structures.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point may be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates an example of a structure of an Evolved Universal Terrestrial Radio Access Network (E-UTRAN) to which the present disclosure is applicable.

The E-UTRAN system is an evolved version of the existing UTRAN system, for example, and is also referred to as 3GPP LTE/LTE-A system. Communication network is widely deployed in order to provide various communication services such as voice (e.g., Voice over Internet Protocol (VoIP)) through IMS and packet data.

Referring to FIG. 2, E-UMTS network includes E-UTRAN, EPC and one or more UEs. The E-UTRAN includes eNBs that provide control plane and user plane protocol, and the eNBs are interconnected with each other by means of the X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, Access Stratum (AS) security control, Core Network (CN) inter-node signaling for supporting mobility between 3GPP access network, IDLE mode UE reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

FIG. 3 illustrates a structure of E-UTRAN and EPC in a wireless communication system to which the present disclosure is applicable.

Referring to FIG. 3, an eNB may perform functions of selecting gateway (e.g., MME), routing to gateway during radio resource control (RRC) is activated, scheduling and transmitting broadcast channel (BCH), dynamic resource allocation to UE in uplink and downlink, mobility control connection in LTE ACTIVE state. As described above, the gateway in EPC may perform functions of paging origination, LTE IDLE state management, ciphering of user plane, bearer control of System Architecture Evolution (SAE), ciphering of NAS signaling and integrity protection.

FIG. 4 illustrates a radio interface protocol structure between a UE and an E-UTRAN in a wireless communication system to which the present disclosure is applicable.

FIG. 4(a) illustrates a radio protocol structure for the control plane, and FIG. 4(b) illustrates a radio protocol structure for the user plane.

Referring to FIG. 4, layers of the radio interface protocol between the UE and the E-UTRAN may be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH may carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, if MAC layer performs the RLC function, the RLC layer may be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers may be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells may be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service may be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

FIG. 5 schematically illustrates a structure of physical channel in a wireless communication system to which the present disclosure is applicable.

Referring to FIG. 5, the physical channel delivers signaling and data through radio resources including one or more subcarriers in frequency domain and one or more symbols in time domain.

One subframe that has a length of 1.0 ms includes a plurality of symbols. A specific symbol (s) of subframe (e.g., the first symbol of subframe) may be used for PDCCH. The PDCCH carries information for resources which are dynamically allocated (e.g., resource block, modulation and coding scheme (MCS), etc.).

Random Access Procedure

Hereinafter, a random access procedure which is provided in a LTE/LTE-A system will be described.

The random access procedure is performed in case that the UE performs an initial access in a RRC idle state without any RRC connection to an eNB, or the UE performs a RRC connection re-establishment procedure, etc.

The LTE/LTE-A system provides both of the contention-based random access procedure that the UE randomly selects to use one preamble in a specific set and the non-contention-based random access procedure that the eNB uses the random access preamble that is allocated to a specific UE.

FIG. 6 illustrates the contention-based random access procedure in the wireless communication system to which the present disclosure is applicable.

(1) Message 1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the corresponding UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary cell RNTI (TC-RNTI), and time alignment command (TAC). The TAC is the information indicating a time synchronization value that is transmitted by the eNB in order to keep the UL time alignment. The UE renews the UL transmission timing using the time synchronization value. On the renewal of the time synchronization value, the UE renews or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC packet data unit and the MAC PDU may be delivered through PDSCH.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

(3) Message 3 (Msg 3)

In case that the UE receives the random access response that is effective with the UE itself, the UE processes the information included in the random access response respectively. That is, the UE applies TAC and stores TC-RNTI. Also, by using UL grant, the UE transmits the data stored in the buffer of UE or the data newly generated to the eNB.

In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. There are two ways how to include the identifier of UE. The first method is that the UE transmits the cell RNTI (C-RNTI) of its own through the UL transmission signal corresponding to the UL grant, if the UE has a valid C-RNTI that is already allocated by the corresponding cell before the random access procedure. Meanwhile, if the UE has not been allocated a valid C-RNTI before the random access procedure, the UE transmits including unique identifier of its own (for example, SAE temporary mobile subscriber identity (S-TMSI) or random number). Normally the above unique identifier is longer that C-RNTI.

If transmitting the data corresponding to the UL grant, the UE initiates a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSI or random number) through the message 3 from the UE, the eNB transmits the 4 message to the UE by using the TC-RNTI that is allocated from the random access response to the corresponding UE. For example, the 4 message may include the RRC connection setup message.

The UE waits for the instruction of eNB for collision resolution after transmitting the data including the identifier of its own through the UL grant included the random access response. That is, the UE attempts the receipt of PDCCH in order to receive a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE determines that the random access procedure is performed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure determining that a normal procedure has been performed. The UE acquires C-RNTI through the 4 message, and after that, the UE and network are to transmit and receive a UE-specific message by using the C-RNTI.

Meanwhile, the operation of the non-contention-based random access procedure, unlike the contention-based random access procedure illustrated in FIG. 11, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB.

Terms used in this specification are described below.

Dedicated bearer: an EPS bearer associated with an uplink packet filter(s) within a UE and a downlink packet filter(s) within a P-GW. In this case, only a specific packet is matched with the filter(s).

Default bearer: an EPS bearer established even new PDN connection. Context of a default bearer is maintained during the lifetime of a PDN connection.

EPS mobility management (EMM)-EMM-NULL state: an EPS service within a UE is deactivated. Any EPS mobility management function is not performed.

EMM-DEREGISTERED state: in the EMM-DEREGISTERED state, EMM context is not established and an MME is not notified of a UE location. Accordingly, the UE is unreachable by the MME. In order to establish EMM context, the UE needs to start an Attach or combined Attach procedure.

EMM-REGISTERED state: In the EMM-REGISTERED state, EMM context within a UE has been established and default EPS bearer context has been activated. When a UE is in the EMM-IDLE mode, an MME is notified of a UE location with accuracy of a list of TAs including a specific number of a TA. The UE may initiate the transmission and reception of user data and signaling information and may respond to paging. Furthermore, a TAU or combined TAU procedure is performed.

EMM-CONNECTED mode: when an NAS signaling connection is set up between a UE and a network, the UE is the EMM-CONNECTED mode. The term "EMM-CONNECTED" may be referred to as a term "ECM-CONNECTED state."

EMM-IDLE mode: when an NAS signaling connection is not present between a UE and a network (i.e., an EMM-IDLE mode without suspend indication) or RRC connection suspend is indicated by a lower layer (i.e., an EMM-IDLE mode with suspend indication), the UE is in the EMM-IDLE mode. The term "EMM-IDLE" may be referred to as a term "ECM-IDLE state."

EMM context: when an Attach procedure is successfully completed, EMM context is established between a UE and an MME.

Control plane CIoT EPS optimization: signaling optimization that enables the efficient transport of user data (IP, non-IP or SMS) through a control plane via an MME. This may optionally include the header compression of IP data.

User plane CIoT EPS optimization: signaling optimization that enables the efficient transport of user data (IP or non-IP) through a user plane.

EPS service(s): a service(s) provided by a PS domain.

NAS signaling connection: a peer-to-peer S1 mode connection between a UE and an MME. An NAS signaling connection has a concatenation of an RRC connection via an LTE-Uu interface and an S1AP connection via an S1 interface.

UE using EPS services with control plane CIoT EPS optimization: UE attached for EPS services with control plane CIOT EPS optimization approved by a network Non-access stratum (NAS): a functional layer for exchanging an UMTS, signaling between a UE and a core network in an EPS protocol stack, and a traffic message. This has a main function of supporting the mobility of a UE and supporting a session management procedure of establishing and maintaining an IP connection between a UE and a PDN GW.

Access stratum (AS): this means a protocol layer under the NAS layer on the interface protocol between an E-UTRAN (eNB) and a UE or between an E-UTRAN (eNB) and an MME. For example, in the control plane protocol stack, the RRC layer, PDCP layer, RLC layer, MAC layer and PHY layer may be collectively referred to as an AS layer or any one of the layers may be referred to as an AS layer. Or, in the user plane protocol stack, the PDCP layer, RLC layer, MAC layer and PHY layer may be collectively referred to as an AS layer or any one of the layers may be referred to as an AS layer.

S1 mode: a mode applied to a system having functional separation according to the use of an S1 interface between a radio access network and a core network. The S1 mode includes a WB-S1 mode and an NB-S1 mode.

NB-S1 mode: this mode is applied by a UE when a serving radio access network of the UE provides access to a network service (via E-UTRA) based on a narrow band (NB)-Internet of things (IoT).

WB-S1 mode: this mode is applied when a system operates in the S1 mode, but is not the NB-S1 mode.

MME Selection for Cellular Internet of Things (CIoT) EPS Optimization

A MME selection function specified in 3GPP technical specification (TS) 23.401 is described below.

The MME selection function selects an available MME for serving a UE. The selection is based on network topology (i.e., the selected MME serves a location of the UE). For overlapping MME service areas, the selection may prefer MMEs with service areas that reduce a probability of changing the MME. When MME/SGSN selects a target MME, the selection function performs a simple load balancing between possible target MMEs. In networks that deploy dedicated MME(s)/SGSN(s) for UEs configured for low access priority, the possible target MME selected by source MME/SGSN is typically restricted to MMEs with the same dedication.

When a MME/SGSN supporting a dedicated core network (DCN) selects a target MME, the selected target MME should be restricted to MMEs that belong to the same DCN. A domain name system (DNS) procedure may be used by the source CN node to select the target MME from a given DCN. If both a low access priority and a UE usage type parameter are used for MME selection, selection based on the UE usage type parameter overrides selection based on the low access priority indication.

When a MME supporting CIoT EPS optimization(s) selects a target MME, the selected MME should support all the CIoT EPS optimizations applicable to a given UE's attachment. In case the source MME is unable to find a target MME matching all CIoT EPS optimization(s) applicable to the given UE's attachment, the source MME, based on implementation, selects a target MME which provides the CIoT EPS optimization(s) best applicable to that UE's attachment.

When an eNB selects an MME, the eNB may use a selection function which distinguishes if a globally unique MME identifier (GUMMEI) is mapped from P-TMSI (Packet-Temporary Mobile Subscriber Identity)/RAI (Routing Area Identification) or is a native GUMMEI. The indication of mapped or native GUMMEI shall be signalled by the UE to the eNB as an explicit indication. The eNB may differentiate between a GUMMEI mapped from P-TMSI/RAI and a native GUMMEI based on the indication signalled by the UE. Alternatively, the differentiation between a GUMMEI mapped from P-TMSI/RAI and a native GUMMEI may be performed based on a value of most significant bit (MSB) of a MME group identifier (MMEGI) (for PLMNs that deploy such mechanism). In this case, if the MSB is set to "0", the GUMMEI is mapped from P-TMSI/RAI, and if the MSB is set to "1", the corresponding GUMMEI is a native GUMMEI. Alternatively the eNB may select the MME only based on the GUMMEI without distinguishing if it is mapped or native.

When DCN(s) are deployed, in order to maintain a UE in the same DCN when the UE enters a new MME pool area, a NAS node selection function (NNSF) of the eNB should have configuration that selects, based on the MMEGI(s) or network resource identifiers (NRIs) of neighboring pool areas, a connected MME from the same DCN. Alternately, for inter-pool intra-RAT mobility, the operator may divide up the entire MMEGI and NRI into non-overlapping sets with each set allocated to a particular DCN. In this case, all eNBs may be configured with the same MME selection configuration. If UE assisted DCN selection feature is supported and a DCN-ID (Identifier) is provided by the UE, the DCN-ID is used in the eNB for MME selection to maintain the same DCN when the serving MME is not available.

When selecting an MME for a UE using narrow band (NB)-IoT RAT and/or for a UE that signals the support for CIoT EPS optimizations in RRC signalling for NB-IoT, the UE indicates whether it supports "User Plane CIoT EPS optimization" and "EPS Attach without PDN Connectivity". And, for wide band (WB)-E-UTRAN, the UE indicates whether it supports "Control Plane CIoT EPS optimization", "User Plane CIoT EPS optimization" and "EPS Attach without PDN Connectivity", and a MME selection algorithm of the eNB selects an MME taking into account the MME's support (or non-support) for the NAS signalling protocol.

When the DCN are deployed for the purpose of CIoT EPS optimization, the UE included CIoT EPS optimization information in the RRC signalling, may be used to perform initial DCN selection depending on eNB configuration.

Indication of CIoT EPS Optimization to Lower Layers

Indication of CIoT EPS optimization to lower layers specified in 3GPP TS 23.401 is described below.

The UE includes an indication of whether to support/prefer to use the following in a NAS message and sends it to the MME.

control plane CIoT EPS optimization, user plane CIoT EPS optimization, EMM-REGISTERED without PDN connection, S1-U data transfer, and header compression The indication of prefer to use is considered as request to use. The indication is passed during an Attach or tracking area update (TAU) procedure. That is, the UE includes the indication in an Attach request message or a TAU request message and sends it to the MME.

In this instance, the NAS layer of the UE provides request to use to the lower layers. That is, the UE-NAS layer passes the indication to the UE-AS layer while performing the Attach or TAU procedure. The indication is used when selecting the MME as described above.

CIoT EPS Optimization

CIoT EPS optimization specified in 3GPP TS 23.401 is described below.

CIoT EPS optimizations provide improved support of small data and short message service (SMS) transfer. A UE supporting CIoT EPS optimizations can indicate the CIoT network behaviour the UE can support and prefer to use during the Attach or TAU procedure. The UE may indicate the support for control plane CIoT EPS optimization, user plane CIoT EPS optimization, EMM-REGISTERED without PDN connection, S1-U data transfer and header compression. The UE may also request to use SMS transfer without combined Attach procedure during the Attach procedure. Furthermore, the UE may, separately from the indication of support, indicate preference for control plane CIoT EPS optimization or user plane CIoT EPS optimization. The indication of preference may be also considered as the request to use.

The UE may be in a NB-S1 mode or a WB-S1 mode when requesting the use of CIoT EPS optimizations during an Attach or TAU procedure. A UE in the NB-S1 mode always indicates support for control plane CIoT EPS optimization. A UE in the NB-S1 mode can also request SMS transfer without the combined procedure by using a normal Attach or TAU procedure.

In the NB-S1 mode, the UE, when requesting the use of CIoT EPS optimization, does not:

request an attach for an emergency bearer services procedure;

request an Attach procedure for initiating a PDN connection for emergency bearer services with an Attach type not set to "EPS emergency attach"; or indicate voice domain preference and UE's usage setting.

The network does not indicate to the UE the support of emergency bearer services when the UE is in the NB-S1 mode.

The control plane CIoT EPS optimization can support efficient transport of user data (internet protocol (IP), non-IP) or SMS messages over a control plane via the MME without triggering data radio bearer (DRB) establishment. The support of control plane CIoT EPS optimization is mandatory for the network in the NB-S1 mode and is optional in the WB-S1 mode. Optional header compression of IP data can be applied to IP PDN type PDN connections that are configured to support header compression.

The user plane CIoT EPS optimization can support change from an EMM-IDLE mode to an EMM-CONNECTED mode without the need for using the service request procedure.

If the UE indicates support of EMM-REGISTERED without PDN connection in the Attach request, the UE may include an EPS Session Management (ESM) DUMMY MESSAGE instead of a PDN CONNECTIVITY REQUEST message as part of the Attach procedure. If the EMM-REGISTERED without PDN connection is supported by the network, the UE and the network can release all the PDN connections at any time, and the UE still remains EPS attached.

For both the UE and the network, the term "EMM-REGISTERED without PDN connection" is equivalent to the term "EPS attach without PDN connectivity".

In the NB-S1 mode, if the UE indicates "SMS only" during a normal Attach or TAU procedure, the MME supporting CIoT EPS optimizations provides SMS so that the UE is not required to perform a combined Attach or TAU procedure.

If the UE supports user plane CIoT EPS optimization, the UE also supports S1-U data transfer.

If the UE indicates support of one or more CIoT EPS optimizations and the network supports one or more CIoT EPS optimizations and decides to accept the Attach request or the TAU request, the network indicates the supported CIoT EPS optimization to the UE per tracking area identity (TAI) list when accepting the UE request. Network indication of support is interpreted by the UE as the acceptance to use the respective feature. After completion of the Attach or TAU procedure, the UE and the network can use the accepted CIoT EPS optimizations for the transfer of user data (IP, non-IP and SMS).

If the UE and the network support both the control plane CIoT EPS optimization and S1-U data transfer, then when receiving the UE's request for a PDN connection, the MME decides whether the PDN connection is service capability exposure function (SCEF) PDN connection or SGi PDN connection:
- if the SCEF PDN connection is to be established for non-IP data type, the MME includes control plane only indication for the requested PDN connection;
- if the SGi PDN connection is to be established and existing SGi PDN connections for this UE were established with control plane only indication, the MME includes control plane only indication for the newly requested SGi PDN connection;
- if the SGi PDN connection is to be established and existing SGi PDN connections for this UE were established without control plane only indication, the MME does not include control plane only indication for the newly requested SGi PDN connection; and
- if the SGi PDN connection is to be established and no SGi PDN connection for this UE exists, the MME determines whether to include control plane only indication for the requested SGi PDN connection based on local policies, the UE's preferred CIoT network behaviour and the supported CIoT network behaviour.

If the network supports user plane CIoT EPS optimization, the network also supports the S1-U data transfer.

Broadcast system information may provide information about support of CIoT EPS optimizations. At reception of new broadcast system information, the lower layers deliver the new broadcast system information to the EMM layer in the UE. The information provided by the lower layers is per PLMN and is used by the UE to determine whether specific CIoT EPS optimization(s) are supported in the cell.

The UE does not attempt to use CIoT EPS optimization(s) which are indicated as not supported.

In the NB-S1 mode, when the UE requests the lower layer to establish a RRC connection and requests the use of EMM-REGISTERED without PDN connection or user plane CIoT EPS optimization, the UE passes an indication of the requested CIoT EPS optimization(s) to the lower layers. If the UE requests the use of S1-U data transfer without user plane CIoT optimization, the UE also passes an indication of user plane CIoT EPS optimization to lower layers.

In the WB-S1 mode, when the UE requests the lower layer to establish a RRC connection and requests the use of EMM-REGISTERED without PDN connection, control plane CIoT EPS optimization or user plane CIoT EPS optimization, the UE passes an indication of the requested CIoT EPS optimization(s) to the lower layers.

Indication for CIoT EPS Optimization

CIoT EPS optimization specified in 3GPP TS 36.331 is described below.

Indication for CIoT EPS optimization that the UE-NAS passes to the lower layer described above is included in a RRC Connection Setup Complete message which is random access (RA) message 5 (msg5), and is sent to the eNB.

The RRC Connection Setup Complete message is used to confirm the successful completion of RRC connection establishment.

This message is sent via signaling radio bearer (SRB) 1. This message is sent via RLC-service access point (SAP) acknowledgement mode (AM) and DCCH. This message is sent to E-UTRAN from the UE.

The following Table 2 illustrates the RRC Connection Setup Complete message.

TABLE 2

```
-- ASN1START
RRCConnectionSetupComplete ::=         SEQUENCE {
    rrc-TransactionIdentifier              RRC-TransactionIdentifier,
    criticalExtensions                     CHOICE {
        c1                                     CHOICE}
            rrcConnectionSetupComplete-r8          RRCConnectionSetupComplete-r8-IEs,
            spare3 NULL, spare2 NULL, spare1 NULL
        },
        criticalExtensionsFuture               SEQUENCE { }
    }
}
RRCConnectionSetupComplete-r8-IEs ::= SEQUENCE {
    selectedPLMN-Identity                  INTEGER (1..maxPLMN-r11),
    registeredMME                          RegisteredMME                OPTIONAL,
    dedicatedInfoNAS                       DedicatedInfoNAS,
```

TABLE 2-continued

```
        nonCriticalExtension            RRCConnectionSetupComplete-v8a0-IEs        OPTIONAL
}
RRCConnectionSetupComplete-v8a0-IEs ::= SEQUENCE {
    lateNonCriticalExtension            OCTET STRING                               OPTIONAL,
    nonCriticalExtension                RRCConnectionSetupComplete-v1020-IEs       OPTIONAL
}
RRCConnectionSetupComplete-v1020-IEs ::= SEQUENCE {
    gummei-Type-r10                     ENUMERATED {native, mapped}                OPTIONAL,
    rlf-InfoAvailable-r10               ENUMERATED {true}                          OPTIONAL,
    logMeasAvailable-r10                ENUMERATED {true}                          OPTIONAL,
    rn-SubframeConfigReq-r10            ENUMERATED {required, notRequired}         OPTIONAL,
    nonCriticalExtension                RRCConnectionSetupComplete-v1130-IEs       OPTIONAL
}
RRCConnectionSetupComplete-v1130-IEs ::= SEQUENCE {
    connEstFailInfoAvailable-r11        ENUMERATED {true}              OPTIONAL,
    nonCriticalExtension                RRCConnectionSetupComplete-v1250-IEs       OPTIONAL
}
RRCConnectionSetupComplete-v1250-IEs ::= SEQUENCE {
    mobilityState-r12                   ENUMERATED {normal, medium, high, spare}   OPTIONAL,
    mobilityHistoryAvail-r12            ENUMERATED {true}              OPTIONAL,
    logMeasAvailableMBSFN-r12           ENUMERATED {true}              OPTIONAL,
    nonCriticalExtension                RRCConnectionSetupComplete-v1320-IEs
        OPTIONAL
}
RRCConnectionSetupComplete-v1320-IEs ::= SEQUENCE {
    ce-ModeB-r13                        ENUMERATED {supported}                     OPTIONAL,
    s-TMSI-r13                          S-TMSI                                     OPTIONAL,
    attachWithoutPDN-Connectivity-r13   ENUMERATED {true}                          OPTIONAL,
    up-CIoT-EPS-Optimization-r13        ENUMERATED {true}                          OPTIONAL,
    cp-CIoT-EPS-Optimization-r13        ENUMERATED {true}                          OPTIONAL,
    nonCriticalExtension                RRCConnectionSetupComplete-v1330-IEs       OPTIONAL
}
RRCConnectionSetupComplete-v1330-IEs ::= SEQUENCE {
    ue-CE-NeedULGaps-r13                ENUMERATED {true}                          OPTIONAL,
    nonCriticalExtension                RRCConnectionSetupComplete-v14xy-IEs       OPTIONAL
}
RRCConnectionSetupComplete-v14xy-IEs ::= SEQUENCE {
    dcn-ID-r14                          INTEGER (0..65535)             OPTIONAL,
    nonCriticalExtension                SEQUENCE { }                   OPTIONAL
}
RegisteredMME ::=                       SEQUENCE {
    plmn-Identity                       PLMN-Identity                              OPTIONAL,
    mmegi                               BIT STRING (SIZE (16)),
    mmec                                MMEC
}
-- ASN1STOP
```

As illustrated in Table 2, Release-13 version 2 specified RRC Connection Setup Complete message includes up-CIoT-EPS-Optimization-r13 field and cp-CIoT-EPS-Optimization-r13 field. If the RRC layer of the UE receives indication for CIoT EPS optimization from the NAS of the UE, value of up-CIoT-EPS-Optimization-r13 field and/or cp-CIoT-EPS-Optimization-r13 field can be set to "true".

The following Table 3 represents the description of fields included in the RRC Connection Setup Complete message.

TABLE 3

| RRC Connection Setup Complete Field Description |
|---|
| Attach without PDN connectivity (attachWithoutPDN-Connectivity) |
| This field is used to indicate that the UE performs an Attach without PDN connectivity procedure, as indicated by the upper layers. |
| Control Plane CIoT EPS Optimization (cp-CIoT-EPS-Optimization) |
| This field is included when the UE supports the control plane CIoT EPS optimization, as indicated by the upper layers. |
| coverage enhancement (ce) Mode B(ce-ModeB) |
| This field indicates whether the UE supports operation in CE mode B. |
| DCN Identify (dcn-ID) |
| The Dedicated Core Network Identity |
| GUMMEI-Type (gummei-Type) |
| This field is used to indicate whether the GUMMEI included is native GUMMEI (i.e., assigned by EPC) or mapped GUMMEI (from 2G/3G identifiers). |
| MMEGI (mmegi) |
| This field provides the group identity of the registered MME within the PLMN, as indicated by the upper layers. |
| Mobility State (mobilityState) |
| This field indicates the UE mobility state just prior to UE going into RRC_CONNECTED state. The UE indicates medium value and high value when being in medium-mobility and high-mobility states respectively. Otherwise the UE indicates the normal value. |

TABLE 3-continued

RRC Connection Setup Complete Field Description

Attach without PDN connectivity (attachWithoutPDN-Connectivity)
This field is used to indicate that the UE performs an Attach without PDN connectivity
procedure, as indicated by the upper layers.
Control Plane CIoT EPS Optimization (cp-CIoT-EPS-Optimization)
This field is included when the UE supports the control plane CIoT EPS optimization, as
indicated by the upper layers.
coverage enhancement (ce) Mode B(ce-ModeB)
This field indicates whether the UE supports operation in CE mode B.
DCN Identify (dcn-ID)
The Dedicated Core Network Identity
GUMMEI-Type (gummei-Type)
This field is used to indicate whether the GUMMEI included is native GUMMEI (i.e., assigned
by EPC) or mapped GUMMEI (from 2G/3G identifiers).
Registered MME (registeredMME)
This field is used to transfer the GUMMEI of the MME where the UE is registered, as indicated
by the upper layers.
Relay Node (RN) Subframe Configuration Request (rn-SubframeConfigReq)
If present, this field indicates that the connection establishment is for an RN and whether a
subframe configuration is requested or not.
Selected PLMN Identify (selectedPLMN-Identity)
This field indicates index of the PLMN selected by the UE from the plmn-IdentityList included
in system information block (SIB)l. The index is 1 if the 1st PLMN is selected from the plmn-
IdentityList included in SIB1, and is 2 if the 2nd PLMN is selected from the plmn-IdentityList
included in SIB1, and so on.
User plane CIoT EPS Optimization (up-CIoT-EPS-Optimization)
This field is included when the UE supports the user plane CIoT EPS optimization, as indicated
by the upper layers.
UE CE UL Gap need (ue-CE-NeedULGaps)
This field indicates whether the UE needs uplink gaps during continuous uplink transmission
in frequency division duplex (FDD).

Control Plane Data Specific NAS Level Congestion Control

According to 3GPP TS 24.301, while a control plane data back-off timer is running, the UE does not initiate any data transfer via control plane CIoT EPS optimization. That is, the UE does not send any Control Plane Service Request with an ESM Data Transport message.

Control plane data specific NAS level congestion control specified in 3GPP TS 24.301 is described below.

Under overload conditions, the MME may restrict requests from the UE for data transmission via Control Plane CIoT EPS Optimization. A control plane data back-off timer may be returned to the UE by the MME (e.g., in Attach/TAU/Routing Area Update (RAU) Accept messages, Service Reject message or Service Accept message). While the control plane data back-off timer is running, the UE does not initiate any data transfer via Control Plane CIoT EPS Optimization. That is, the UE does not send any Control Plane Service Request with an ESM Data Transport message. The MME stores the control plane data back-off timer per UE. The MME rejects any further request (other than exception reporting) for data transmission via Control Plane Service Request from the UE while the control plane data back-off timer is still running.

The control plane data back-off timer does not affect any other mobility management or session management procedure.

The control plane data back-off timer does not apply to user plane data communication.

If the UE is allowed to send exception reporting, the UE may initiate Control Plane Service Request for the exception reporting even if the control plane data back-off timer is running.

If the UE receives an ESM Data Transport message while in a connected mode from the MME while the control plane data back-off timer is running, the UE stops the control plane data back-off timer. The control plane data back-off timer is stopped at PLMN change.

If the MME receives a Control Plane Service Request with the ESM Data Transport message and decides to send the UE the control plane data back-off timer, the MME may decide to process the Control Plane Service Request with the ESM Data Transport message (i.e., decrypt the data payload, or not based on the following):

If the UE has additionally indicated in a release assistance information in the NAS protocol data unit (PDU) that no further uplink or downlink data transmission is expected, the MME processes (integrity check/decipher/forward) the received control plane data packet, and sends the UE a SERVICE ACCEPT message with the control plane data back-off timer. The UE interprets this as successful transmission of the control plane data packet and starts the control plane data back-off timer.

For all other cases, the MME may decide to not process the received control plane data packet and may send the UE SERVICE REJECT with the control plane data back-off timer. The UE interprets this indication as unsuccessful delivery of the control plane data packet and starts the control plane data back-off timer. The MME may take into consideration whether the PDN connection is set to Control Plane only to make the decision whether to reject the packet. The MME may send SERVICE REJECT or move the PDN connection to user plane and process the data packet.

Alternatively, if the UE has not provided the release assistance information in the control plane service request, and the EPS bearer belongs to a PDN connection not set to Control Plane only, and the UE supports user plane EPS CIoT optimization (or legacy S1-U), then the MME may initiate establishment of S1-U bearer during data transport in control plane CIoT EPS optimization. In this case, the MME may also return the control plane data back-off timer within the NAS message.

The MME includes the control plane data back-off timer only if the UE has indicated support for the control plane data back-off timer in the Attach/TAU/RAU request.

If the MME is overloaded or close to overload, but the UE has not indicated support for the control plane data back-off timer, the MME can use other overload control mechanisms (e.g., mobility management back-off timer or user plane data communication).

According to 3GPP TS 24.301 as above, if the control plane data back-off timer (i.e., timer T3446) is running, 1. the UE in the EMM-IDLE mode does not initiate the transport of user data via the control plane procedure,
2. the UE does not start the TAU procedure with "signalling active" flag.

The 1) is the case of sending a control plane service request (CPSR) message with an ESM message container (ESM Data Transport message), and the 2) is the case of sending a TAU request message with an active flag.

Handling of congestion control for transport of user data via the control plane specified in 3GPP TS 24.301 is described below.

The network may activate congestion control for transport of user data via the control plane.

If the congestion control for transport of user data via the control plane is active and if the UE has indicated support for the control plane data back-off timer, the network includes a value for the control plane data back-off timer T3446 in ATTACH ACCEPT, TAU ACCEPT, SERVICE ACCEPT or SERVICE REJECT message. And, the network stores a control plane data back-off time on a per UE basis. The UE starts the timer T3446 with the value informed in the message. To avoid the large number of UEs from simultaneously initiating deferred requests, the network should select the value for the timer T3446 for the informed UEs so that timeouts are not synchronised.

Based on the stored control plane data back-off time for the UE, the network may reject the transfer of user data via the control plane initiated by the UE.

While the timer T3446 is running, the UE in the EMM-IDLE mode does not initiate the transport procedure of user data via the control plane, except if the UE is allowed to use exception data reporting and the user data is related to an exceptional event.

Upon entering the EMM-DEREGISTERED state or a new PLMN which is not equivalent to the PLMN where the UE started the timer T3446, or upon being switched off while the timer T3446 is running, the UE stops the timer T3446.

Normal and periodic TAU procedures specified in 3GPP TS 24.301 are described below.

In particular, abnormal cases in the UE are described.

a) While the timer T3446 is running
the UE does not start the TAU procedure with the "signalling active" flag unless:
the UE is a UE configured to use access class (AC) 11-15 in selected PLMN; or
the UE in the NB-S1 mode is requested by the upper layer to transmit user data related to an exceptional event, and the UE is allowed to use exception data reporting.

The UE stays in a current serving cell and applies a normal cell reselection process.

A service request procedure specified in 3GPP TS 24.301 is described below.

First, the case of being accepted by the network (particularly, UE using EPS service using control plane CIoT EPS optimization) is described.

If T3446 value information element (IE) is present in the received SERVICE ACCEPT message, the UE:
stops the timer T3446 if it is running;
considers the transport of user data via the control plane as successful; and
starts the timer T3446 with a value provided in the T3446 value IE.

If the UE is using EPS services with control plane CIoT EPS optimization, and if the T3446 value IE is present in the SERVICE ACCEPT message and the value indicates that this timer is either zero or deactivated, the UE considers this case as an abnormal case and performs a behaviour according to the abnormal case described below.

If the UE in the EMM-IDLE mode initiates the service request procedure by sending a CONTROL PLANE SERVICE REQUEST message and the SERVICE ACCEPT message does not include the T3446 value IE, and if the timer T3446 is running, then the UE stops the timer T3446.

Abnormal cases in the UE are described below.

o) While the timer T3446 is running,
the UE in the EMM-IDLE mode does not initiate the procedure for transport of user data via the control plane unless:
the UE is a UE configured to use AC11-15 in selected PLMN; or
the UE in the NB-S1 mode is requested by the upper layer to transmit user data related to an exceptional event and the UE is allowed to use exception data reporting.

The UE stays in a current serving cell and applies a normal cell reselection process.

Timers of EPS mobility management specified in 3GPP TS 24.301 are described below.

Table 4 illustrates an EPS mobility management timer at the UE side.

TABLE 4

| Timer No. | Time Value | State | Cause of start | Normal stop | Upon expiry of timer |
|---|---|---|---|---|---|
| T3446 | See Note 10 | All except EMM-NULL | ATTACH ACCEPT message or TRACKING AREA UPDATE ACCEPT message or SERVICE ACCEPT message received with a non-zero T3446 value. SERVICE REJECT message received with EMM cause #22 "Congestion" and a non-zero T3446 value. | SERVICE ACCEPT message or TRACKING AREA UPDATE ACCEPT message received without T3446 value | Allowed to initiate transfer of user data via the control plane |

MME Control of Overload for Control Plane

The MME may contain mechanisms for avoiding and handling overload situations. These can include the use of NAS signalling to reject NAS requests from UEs.

In addition, under unusual circumstances, the MME may restrict the load that the eNBs of the MME are generating on it if it is configured to enable the overload restriction. This can be achieved by the MME invoking the S1 interface overload procedure to all the eNBs or to a proportion of the eNBs with which the MME has S1 interface connections. To reflect an amount of load that the MME wishes to reduce, the MME can adjust the proportion of eNBs which are sent a S1 interface OVERLOAD START message and content of the OVERLOAD START message.

The MME selects the eNBs at random (so that if two MMEs within a pool area are overloaded, they do not both send OVERLOAD START messages to exactly the same set of eNBs).

The MME may optionally include a Traffic Load Reduction Indication in the OVERLOAD START message. In this case, if supported, the eNB reduces a type of traffic indicated according to the requested percentage.

An MME supporting Control Plane CIoT EPS Optimization may include an indication, in the OVERLOAD START message, indicating overload from data transfers via Control Plane CIoT EPS Optimization.

Using the OVERLOAD START message, the MME can request the eNB to:
- reject RRC connection requests that are for non-emergency, non-exception reporting and non-high priority mobile originated services; or
- reject new RRC connection requests for EPS mobility management signalling (e.g. for TA updates) for that MME;
- only permit RRC connection requests for emergency sessions and mobile terminated services for that MME. This blocks emergency session requests from UEs with universal subscriber identity modules (USIMs) provisioned with access classes (ACs) 11 and 15 when they are in their home PLMN (HPLMN)/EHPLMN (equivalent to the HPLMN) and from UEs with USIMs provisioned with ACs 12, 13 and 14 when they are in their home country; or
- only permit RRC connection requests for high priority sessions, exception reporting and mobile terminated services for that MME;
- reject new RRC connection requests from UEs that access the network with low access priority;
- not accept RRC connection requests with RRC establishment cause "mo-data" or "delayTolerantAccess" from UEs that support only Control Plane CIoT EPS Optimization.

When rejecting an RRC connection request for overload reasons, the eNB indicates to the UE an appropriate timer value that limits further RRC connection requests for a while.

An eNB supports rejecting of RRC connection establishments for specific UEs. Additionally, an eNB provides support for the barring of UEs configured for extended access barring. If the UE is camping on NB-IoT, the extended access barring does not apply.

An eNB may initiate extended access barring when:
- all the MMEs connected to this eNB request to restrict the load for UEs that access the network with low access priority; or
- requested by O&M.

If an MME invokes the S1 interface overload procedure to restrict the load for UEs that access the network with low access priority, the MME should select all eNBs with which the MME has S1 interface connections. Further, the selected eNBs may be limited to a subset of the eNBs with which the MME has S1 interface connection (e.g., particular location area or where devices of the targeted type are registered).

During an overload situation, the MME should attempt to maintain support for emergency bearer services and for MPS.

When the MME is recovering, the MME can either, to all the eNBs or some of the eNBs:
- send OVERLOAD START messages with new percentage value that permit more traffic to be carried, or
- sends OVERLOAD STOP messages.

In addition, to protect the network from overload, the MME has the option of rejecting NAS request messages which include the low access priority indicator before rejecting NAS request messages without the low access priority indicator.

Overload Control for Control Plane

Overload control for the control plane specified in TS 36.413 is described below.

The Overload Start procedure is to inform an eNB to reduce the signalling load towards the concerned MME.

The procedure uses non-UE associated signalling.

FIG. 7 illustrates an overload start procedure in a wireless communication system to which the present disclosure is applicable.

Referring to FIG. 7, the eNB receiving the OVERLOAD START message assumes the MME from which it receives the message as being in an overloaded state.

If an Overload Action IE in an Overload Response IE within the OVERLOAD START message is set to,
- "reject RRC connection establishments for non-emergency mobile originated data transfer" (i.e., reject traffic corresponding to RRC cause "mo-data", "mo-VoiceCall" and "delayTolerantAccess"), or
- "reject RRC connection establishments for signalling" (i.e., reject traffic corresponding to RRC cause "mo-data", "mo-signalling", "mo-VoiceCall" and "delayTolerantAccess"), or
- "only permit RRC connection establishments for emergency sessions and mobile terminated services" (i.e., only permit traffic corresponding to RRC cause "emergency" and "mt-Access"), or
- "only permit RRC connection establishments for high priority sessions and mobile terminated services" (i.e., only permit traffic corresponding to RRC cause "highPriorityAccess" and "mt-Access"), or
- "reject only RRC connection establishment for delay tolerant access" (i.e., only reject traffic corresponding to RRC cause "delayTolerantAccess"), or
- "not accept RRC connection requests for data transmission from UEs that only support Control Plane CIoT EPS Optimization" (i.e., not accept traffic corresponding to RRC cause "mo-data" or "delayTolerantAccess"), The eNB:
- if the Traffic Load Reduction Indication IE is included in the OVERLOAD START message and, if supported, reduce the signalling traffic indicated as to be rejected by the indicated percentage,
- otherwise ensure that only the signalling traffic not indicated as to be rejected/not accepted is sent to the MME.

If the GUMMEI List IE is present, the eNB, if supported, uses this information to identify to which traffic the above defined rejections are applied.

If an overload action is ongoing and the eNB receives a further OVERLOAD START message, the eNB replaces the ongoing overload action with the newly requested message. If the GUMMEI List IE is present, the eNB replaces applicable ongoing actions.

The Overload Stop procedure is to signal to an eNB connected to the MME that the overload situation at the MME has ended and normal operation has resumed.

The procedure uses non-UE associated signalling.

FIG. 8 illustrates an overload stop procedure in a wireless communication system to which the present disclosure is applicable.

Referring to FIG. 8, the eNB receiving the OVERLOAD STOP message assumes that the overload situation at the MME from which it receives the message has ended and has resume normal operation for the applicable traffic towards this MME.

If the GUMMEI List IE is present, the eNB, if supported, uses this information to identify which traffic to cease rejecting. If no particular overload action is ongoing for a particular GUMMEI value, the eNB ignores this value.

Table 5 illustrates a MME CONFIGURATION UPDATE FAILURE message.

The message is sent, by the eNB, to the MME to indicate the SI MME configuration update failure.

TABLE 5

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Cause | M | | 9.2.1.3 | | YES | ignore |
| Time to wait | O | | 9.2.1.61 | | YES | ignore |
| Criticality Diagnostics | O | | 9.2.1.21 | | YES | ignore |

As illustrated in Table 5, 'IE/Group Name' represents name of information element (IE) or IE group. In the 'Presence' field, 'M' is a mandatory IE and represents an IE/IE group that is always included in the message, 'O' is an optional IE and represents an IE/IE group that may be included or not included in the message, 'C' is a conditional IE and represents an IE/IE group that is included in the message only when particular conditions are satisfied. The 'Range' field represents the number by which repetitive IEs/IE groups can be repeated.

The 'IE type and reference' field represents a type (e.g., ENUMERATED, INTEGER, OCTET STRING, etc.) of the corresponding IE, and represents a range of value if the range of value the corresponding IE can have is present.

The 'Criticality' field represents criticality information applied to the IE/IE group. The criticality information means information indicating how to operate at a receiving end if all or part of the IE/IE group is not comprehended at the receiving end. Further, represents that the criticality information is not applied, and 'YES' represents that the criticality information is applied. 'GLOBAL' represents that the IE and repetitions of the corresponding IE have one common criticality information. 'EACH' represents that each repetition of the IE has unique criticality information. The 'Assigned Criticality' field represents actual criticality information.

The Message Type IE uniquely identifies messages transmitted.

The Cause IE indicates a reason for a particular event for S1AP protocol.

The Time to wait IE defines a minimum allowed wait time.

The Criticality Diagnostics IE is sent by a base station or the MME if part of a received message is not comprehended or is missed, or if the received message contains logical errors. When the IE is applied, the IE contains information about which certain IE was not comprehended or was missed.

Table 6 illustrates an OVERLOAD START message.

This message is sent by the MME to indicate to the eNB that the MME is in an overloaded state.

TABLE 6

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| Overload Response | M | | 9.2.3.19 | | YES | reject |
| GUMMEI List | | 0 ... 1 | | | YES | ignore |
| >GUMMEI List Item | | 1 ... <maxnoofMMECs> | | | EACH | ignore |
| >>GUMMEI | M | | 9.2.3.9 | | — | |
| Traffic Load Reduction Indication | O | | 9.2.3.36 | | YES | ignore |

As illustrated in Table 6, the Overload Response IE indicates an operation required of the eNB in an overload state The GUMMEI List IE includes GUMMEI. 'maxnoofM-MECs' represents that the maximum number of MME codes (MMECs) per node per RAT.

The Traffic Load Reduction Indication IE indicates a percentage of a type of traffic relative to an instantaneous incoming rate at the eNB to be rejected, as indicated in the Overload Action IE.

Table 7 illustrates an OVERLOAD STOP message.

The message is sent by the MME to indicate to the eNB that the MME is no longer in the overload state.

TABLE 7

| IE/Group Name | Presence | Range | IE type and reference | Semantics description | Criticality | Assigned Criticality |
|---|---|---|---|---|---|---|
| Message Type | M | | 9.2.1.1 | | YES | reject |
| GUMMEI List | | 0 . . . 1 | | | YES | ignore |
| >GUMMEI List Item | | 1 . . . <maxnoofMMECs> | | | EACH | ignore |
| >>GUMMEI | M | | 9.2.3.9 | | — | |

RRC Establishment Cause

RRC establishment cause specified in TS 24.301 is described below.

When the EMM requests the establishment of a NAS-signalling connection, or when the EMM requests the lower layers to resume a NAS signalling connection, the RRC establishment cause used by the UE is selected according to the NAS procedure as specified in TS 24.301 Table D.1.1. The EMM also indicates to the lower layer for the purpose of access control, the call type associated with the RRC establishment cause as specified in TS 24.301 Table D.1.1. If the UE is configured for the Extended Access Barring (EAB), the EMM indicates to the lower layer for the purpose of access control that the EAB applies for this request except for the following cases:

the UE is a UE configured to use AC11-15 in selected PLMN;
the UE is answering to paging;
the RRC Establishment cause is set to "Emergency call";
the UE is configured to allow overriding EAB and receives an indication from the upper layers to override EAB; or
the UE is configured to allow overriding EAB and already has a PDN connection that was established with EAB override.

CP Overload Control

The motivation of core network overload control for CP data is only to restrict requests from UEs for data transmission via CP (i.e., TAU Request with "signalling active" flag and Control Plane Service Request on which an ESM Data Transport message is piggybacked). Other NAS signalling messages (e.g., Attach and TAU without "signalling active" flag) and services (e.g., SMS) are still allowed.

(1) If both RRC causes "mo-data" and "delayTolerantAccess" are used by the eNB for the overload control for CP data, the eNB will reject all RRC Connection Requests initiated by a UE that supports only CP CIoT EPS Optimization and is configured as NAS signalling low priority. Consequently, all initial NAS procedures may fail.

(2) According to the discussion above, if only "mo-data" is used by the eNB for the overload control for CP data, a UE that supports only CP CIoT EPS Optimization and is configured as NAS signalling low priority can skip the overload control for CP data at the eNB.

The problems of the (1) and the (2) were raised.

In 3GPP RAN2 #97bis meeting, after the eNB receiving an Overload Start message (control plane CIoT data, RRC establishment cause='mo-data' and/or 'delaytolerantAccess') from the MME receives RA msg5 (i.e., RRC Connection Complete message), the eNB determines whether to apply to the overload control and, if applicable, the eNB includes extendedWaitTime-CPdata timer in a RRC Connection Release message and sends it.

Such a solution is described with reference to the following drawing.

FIG. 9 illustrates a procedure of an overload start message for data transmission via a control plane in a wireless communication system to which the present disclosure is applicable.

1. MME load from Control Plane CIoT EPS Optimization reaches a threshold. A decision to restrict data transfer via Control Plane CIoT EPS Optimization is taken based on operator's policy or configuration.

2. The MME sends an Overload Start message with a Control Plane CIoT data parameter to eNB meaning that the MME is overloaded or close to overload with data transfer via Control Plane CIoT EPS Optimization.

3. When the eNB receives a request for data transmission via Control Plane CIoT EPS Optimization and there is no MME identity (i.e., set in the RRC message), the eNB does not select the overloaded MME until the Overload Stop message is received. However, the eNB may still select the overloaded MME for signalling only or for data transmission via User Plane CIoT EPS Optimization.

4. If the overloaded MME is the only MME to which the eNB is connected, and the RRC message has an MME identity (i.e., RegisteredMME parameter in the RRC Connection Setup Complete message, and MME identity indicates the overloaded MME):

Option 1: The eNB may reject requests from UEs for data transfer via Control Plane CIoT EPS Optimization. And, the eNB may include a wait timer in the RRC Connection Reject/Release message; or Option 2: The eNB may reject requests from UEs that indicate mo-data in the RRC connection establishment cause and also indicate support only for Control Plane CIoT EPS Optimization in the RRC Connection Setup Complete message. The eNB may return a wait time in the RRC Connection Release message.

In both the Option 1 and the Option 2, the eNB does not reject requests from UEs for data transfer via Control Plane CIoT EPS Optimization for exception reporting unless rejection of exception reporting is indicated in the Overload Start message in the above step 2.

The following operation has agreed based on the above solution as follows.

Reception of the RRC Connection Release by the UE
The UE:
1> except for NB-IoT, bandwidth reduced (BL) UEs or UEs in coverage enhancement (CE), delays the following actions 60 ms from the moment the RRC Connection Release message was received or optionally when lower layers indicate that the receipt of the RRC Connection Release message has been successfully acknowledged, whichever is earlier;
1> for BL UEs or UEs in CE, delays the following actions 1.25 seconds from the moment the RRC Connection Release message was received or optionally when lower layers indicate that the receipt of the RRC Connection Release message has been successfully acknowledged, whichever is earlier;
1> for NB-IoT, delays the following actions 10 seconds from the moment the RRC Connection Release message was received or optionally when lower layers indicate that the receipt of the RRC Connection Release message has been successfully acknowledged, whichever is earlier.
1> if the RRC Connection Release message includes idleModeMobilityControlInfo:
2> stores cell reselection priority information provided by the idleModeMobilityControlInfo;
2> if the t320 is included:
3> starts a timer T320 with a timer value set according to a value of t320;
1> else:
2> applies the cell reselection priority information broadcasted in system information;
1> for NB-IoT, if the RRC Connection Release message includes redirectedCarrierInfo:
2> if the redirectedCarrierOffsetDedicated is included in the redirectedCarrierinfo:
3> stores the redirectedCarrierOffsetDedicated for the frequency in redirectedCarrierInfo;
3> starts a timer T322 with a timer value set according to a value of T322 in redirectedCarrierInfo;
1> if the releaseCause received in the RRC Connection Release message indicates loadBalancingTAURequired:
2> performs the actions upon leaving RRC_CONNECTED with release cause 'load balancing TAU required';
1> else if the releaseCause received in the RRC Connection Release message indicates cs (circuit switched)-FallbackHighPriority:
2> performs the actions upon leaving RRC_CONNECTED with release cause 'CS Fallback High Priority';
1> else:
2> if the extendedWaitTime is present; and
2> if the UE supports delay tolerant access or the UE is a NB-IoT UE:
3> forwards the extendedWaitTime to upper layers;
2> if the extendedWaitTime-CPdata is present and the NB-IoT UE only supports the Control Plane CIoT EPS optimization:
3> forwards the extendedWaitTime-CPdata to upper layers;
2> if the releaseCause received in the RRC_Connection Release message indicates rrc-Suspend:
3> performs the actions upon leaving RRC_CONNECTED with release cause 'RRC suspension';
2> else:
3> performs the actions upon leaving RRC_CONNECTED with release cause 'other';

The following Table 8 illustrates a RRC Connection Release-NB message.

The RRC Connection Release-NB message is used to command the release of an RRC connection.

The message is sent via SRB 1 or SRB 1 bis. The message is sent via RLC-SAP AM, and DCCH. The message is sent to the UE from the E-UTRAN.

TABLE 8

```
-- ASN1START
RRCConnectionRelease-NB ::=   SEQUENCE {
    rrc-TransactionIdentifier        RRC-TransactionIdentifier,
    criticalExtensions               CHOICE {
        c1                               CHOICE {
            rrcConnectionRelease-r13         RRCConnectionRelease-NB-r13-IEs,
            spare1 NULL
        },
        criticalExtensionsFuture         SEQUENCE { }
    }
}
RRCConnectionRelease-NB-r13-IEs ::= SEQUENCE {
    releaseCause-r13                 ReleaseCause-NB-r13,
    resumeIdentity-r13               ResumeIdentity-r13             OPTIONAL,   -- Need OR
    extendedWaitTime-r13             INTEGER (1..1800)              OPTIONAL,   -- Need ON
    redirectedCarrierInfo-r13        RedirectedCarrierInfo-NB-r13   OPTIONAL,   -- Need ON
    lateNonCriticalExtension         OCTET STRING                   OPTIONAL,
    nonCriticalExtension             RRCConnectionRelease-NB-v14xy-IEs    OPTIONAL
}
RRCConnectionRelease-NB-v14xy-IEs ::= SEQUENCE {
    redirectedCarrierInfo-v14xy      RedirectedCarrierInfo-NB-v14xy    OPTIONAL,   -- Cond Redirection
    extendedWaitTime-CPdata-r14      INTEGER (1..1800)  OPTIONAL,      -- Cond NoExtendedWaitTime
    nonCriticalExtension             SEQUENCE { }                       OPTIONAL
}
ReleaseCause-NB-r13 ::=              ENUMERATED {loadBalancingTAUrequired, other,
                                         rrc-Suspend, spare1}
RedirectedCarrierInfo-NB-r13::=      CarrierFreq-NB-r13
```

TABLE 8-continued

```
RedirectedCarrierInfo-NB-v14xy ::=      SEQUENCE {
redirectedCarrierOffsetDedicated-r14        ENUMERATED{
                                                dB1, dB2, dB3, dB4, dB5, dB6, dB8, dB10,
                                                dB12, dB14, dB16, dB18, dB20, dB22, dB24,
dB26},
    t322-r14                                ENUMERATED{
                                                min5, min10, min20, min30, min60, min120,
min180,
                                                spare1}
}
-- ASN1STOP
```

As illustrated in Table 8, the RRC Connection Release-NB message includes RRCConnectionRelease-NB-v14xy-IEs field, and the field includes extendedWaitTime-CPdata-r14 field. The extendedWaitTime-CPdata-r14 field may be indicated as one of values 1 to 1800.

The following Tables 9 and 10 explain fields included in the RRC Connection Release-NB message.

TABLE 9

RRCConnectionRelease-NB Field Description extendedWaitTime
Value in seconds.
extendedWaitTime-CPdata
Wait time for user data access via the control plane. Value in seconds.
redirectedCarrierInfo
The redirectedCarrierInfo indicates a carrier frequency (downlink for FDD) and is used to redirect the UE to a NB-IoT carrier frequency by means of the cell selection upon leaving RRC_CONNECTED.
redirectedCarrierOffsetDedicated
Parameter "Qoffsetdedicatedfrequency" in TS 36.304. For NB-IoT carrier frequencies, a UE that supports multi-band cells considers the redirectedCarrierOffsetDedicated to be common for all overlapping bands.
releaseCause
The releaseCause is used to indicate the reason for releasing the RRC Connection.
E-UTRAN should not set the releaseCause to loadBalancingTAURequired if the extendedWaitTime is present.
t322
Timer T322. Value minN corresponds to N minutes.

TABLE 10

| Conditional Presence | Explanation |
| --- | --- |
| NoExtendedWaitTime | The field is optionally present, need ON, if the extendedWaitTime is not included; otherwise the field is not present. |
| Redirection | The field is optionally present, need ON, if redirectedCarrierInfo is included; otherwise the field is not present. |

Service Request Procedure Initiation for CP CIoT EPS Optimization

A service request procedure specified in TS 24.301 is described below.

The UE invokes the service request procedure when:

a) the UE in the EMM-IDLE mode receives a paging request with CN domain indicator set to "Packet Switched (PS)" from the network;

b) the UE in the EMM-IDLE mode has pending user data to be sent;

c) the UE in the EMM-IDLE mode has uplink signalling pending;

d) the UE in the EMM-IDLE or the EMM-CONNECTED mode is configured to use CS fallback and has a mobile originating CS fallback request from the upper layer;

e) the UE in the EMM-IDLE mode is configured to use CS fallback and receives a paging request with CN domain indicator set to "CS" from the network, or the UE in the EMM-CONNECTED mode is configured to use CS fallback and receives a CS SERVICE NOTIFICATION message;

f) the UE in the EMM-IDLE or the EMM-CONNECTED mode is configured to use 1×CS fallback and has a mobile originating 1×CS fallback request from the upper layer;

g) the UE in the EMM-CONNECTED mode is configured to use 1×CS fallback and accepts cdma2000 signalling messages containing a 1×CS paging request received over E-UTRAN;

h) the UE in the EMM-IDLE mode has uplink cdma2000 signalling pending to be transmitted over E-UTRAN;

i) the UE in the EMM-IDLE or EMM-CONNECTED mode is configured to use 1×CS fallback, accepts cdma2000 signalling messages containing a 1×CS paging request received over cdma2000 1×RTT, and the network supports dual Rx Circuit Switched FallBack (CSFB) or provide CS fallback registration parameters;

j) the UE in the EMM-IDLE or the EMM-CONNECTED mode has uplink cdma2000 signalling pending to be transmitted over cdma2000 1×RTT, and the network supports dual Rx CSFB or provide CS fallback registration parameters;

k) the UE performs an inter-system change from S101 mode to S1 mode and has user data pending;

l) the UE in the EMM-IDLE mode has to request resources for proximity service (ProSe) direct discovery or Prose direct communication; or m) the UE in the EMM-CONNECTED mode has a NAS signalling connection only, is using EPS services with control plane CIoT EPS optimization, and has pending user data to be sent via user plane radio bearers; or n) the UE in the EMM-IDLE mode has to request resources for V2X communication over PC5 (interface between UEs).

for sending signalling different from SMS, the UE does not include any ESM message container or NAS message container IE in the CONTROL PLANE SERVICE REQUEST message.

Control Plane Service Request (CPSR) Message

A CPSR specified in TS 24.301 is described below.

Table 11 illustrates a CONTROL PLANE SERVICE REQUEST (CPSR) message.

This message is sent by the UE to the network when the UE is using EPS services with control plane CIoT EPS optimization.

TABLE 11

| IEI | Information Element | Type/Reference | Presence | Format | Length |
|-----|---------------------|----------------|----------|--------|--------|
|     | Protocol discriminator | Protocol discriminator 9.2 | M | V | ½ |
|     | Security header type | Security header type 9.3.1 | M | V | ½ |
|     | Control plane service request message identity | Message type 9.8 | M | V | 1 |
|     | Control plane service type | Control plane service type 9.9.3.47 | M | V | ½ |
|     | NAS key set identifier | NAS key set identifier 9.9.3.21 | M | V | ½ |
| 78  | ESM message container | ESM message container 9.9.3.15 | O | TLV-E | 3-n |
| 67  | NAS message container | NAS message container 9.9.3.22 | O | TLV | 4-253 |
| 57  | EPS bearer context status | EPS bearer context status 9.9.2.1 | O | TLV | 4 |
| D-  | Device properties | Device properties 9.9.2.0A | O | TV | 1 |

The UE sends a CONTROL PLANE SERVICE REQUEST message, starts T3417, and enters an EMM-SERVICE-REQUEST-INITIATED state.

For the case a), a control plane service type of the CONTROL PLANE SERVICE REQUEST message sets to "mobile terminating request". The UE may include an ESM DATA TRANSPORT message. The UE does not include any ESM message other than the ESM DATA TRANSPORT message.

For the case b), if the UE has pending IP or non-IP user data that is to be sent via the control plane radio bearers, the control plane service type of the CONTROL PLANE SERVICE REQUEST message sets to "mobile originating request". The UE includes an ESM DATA TRANSPORT message in the ESM message container IE.

For the cases b) and m), if the UE has pending IP or non-IP user data that is to be sent via the user plane radio bearers, the UE sets the control plane service type of the CONTROL PLANE SERVICE REQUEST message to "mobile originating request" and sets the "active" flag in the control plane service type IE to 1. The UE does not include any ESM message container or NAS message container IE in the CONTROL PLANE SERVICE REQUEST message.

For the case c), the UE sets the control plane service type of the CONTROL PLANE SERVICE REQUEST message to "mobile originating request". If the CONTROL PLANE SERVICE REQUEST message is:

for sending SMS, the UE includes the SMS message in the NAS message container IE and does not include any ESM message container IE in the CONTROL PLANE SERVICE REQUEST message; and As illustrated in Table 11, the protocol discriminator is defined in 3GPP TS 24.007. A protocol discriminator in a header of a security protected NAS message is encoded as "EPS mobility management message".

Bits 5 to 8 of the first octet every EPS Mobility Management (EMM) message contain a security header type IE. This IE includes control information related to security protection of a NAS message. The total size of the security header type IE is 4 bits.

The control plane service request message identity is used to identify what message (i.e., CPSR message) the NAS message sent is.

The control plane service type IE specifies the purpose of a CONTROL PLANE SERVICE REQUEST message.

If the UE wants to send an ESM message to the network, the UE includes the ESM message container IE in the CPSR message. The purpose of the ESM message container IE is to piggyback and send a single ESM message (i.e., MO data, ESM data transport message) in the EMM message.

If the UE is in the EMM-IDLE mode and has a pending SMS message to be sent, the UE includes the NAS message container IE in the CPSR message.

If the UE wants to indicate EPS bearer context activated in the UE, the UE includes the EPS bearer context status IE in the CPSR message.

If the UE is configured as NAS signalling low priority, the UE includes the device properties IE in the CPSR message.

The control plane service type IE in Table 11 is coded as in the following Table 12.

TABLE 12

Control Plane Service type Value (octet 1, bit 1 to 3)

| Bits | | | |
| --- | --- | --- | --- |
| 3 | 2 | 1 | |
| 0 | 0 | 0 | mobile originating request |
| 0 | 0 | 1 | mobile terminating request |
| 0 | 1 | 0 | |
| | to | | unused; shall be interpreted as "mobile originating request", if received |
| 1 | 1 | 1 | by the network |

All other values are reserved.
"Active" flag (octet 1, bit 4)

| Bit | |
| --- | --- |
| 4 | |
| 0 | No radio bearer establishment requested |
| 1 | Radio bearer establishment requested |

Overload Control Method

As below, the following agreements/requirements have been specified in relation to the control plane (CP) overload control.

The following is specified in 3GPP TS 23.401.

Using the OVERLOAD START message, the MME can request the eNB to:

not accept RRC connection requests with RRC establishment cause "mo-data" or "delayTolerantAccess" from UEs that only support CP CIoT EPS Optimization.

Furthermore, the following is specified in 3GPP TS 36.413.

The Overload Action IE in the Overload Response IE within the OVERLOAD START message can be set not to accept RRC connection requests for data transmission from UEs that only support CP CIoT EPS Optimization (i.e., not accept traffic corresponding to RRC cause "mo-data" or "delayTolerantAccess").

According to the above regulation, the eNB should comprehend the following information via the RRC message that the UE sends for the purpose of access, and determine whether to apply the extended wait timer for CP data according to the overload.

1) RRC connection request with RRC establishment cause "mo-data" or "delayTolerantAccess"

2) UE that supports CP CIoT EPS Optimization only

The 1) above can be comprehended by the eNB through the existing specified action via the RRC establishment cause that is sent being included in the RRC connection request message.

However, according to clause 2.2.3.3 in 3GPP TS 36.331, the 2) above is sent being included in the RA msg5 (i.e., RRC Connection Complete message). Thus, after receiving up to RA message 5 (msg5), the eNB can determine whether to apply the overload control for CP data.

Thus, the eNB receives the RA message 5 (msg5) and then determines whether to apply the overload control for CP data, and if applicable, the eNB includes extendedWait-Time-CPdata timer in the RRC release message and sends it to the AS layer of the UE (i.e., RRC layer of the UE). The AS layer of the UE passes the extendedWaitTime-CPdata timer to the NAS layer of the UE. The NAS layer of the UE is expected to operate applying a value of the extended WaitTime-CPdata timer to the timer T3446 (i.e., CP back-off timer).

In relation to such operations, since both the RRC causes "mo-data" and "delayTolerantAccess" can be used by the eNB to reject the RRC connection request from the UE that supports only CP CIoT EPS Optimization, the following problems were raised.

(1) If both the RRC causes "mo-data" and "delayTolerantAccess" are used for the overload control for CP data of the eNB (i.e., if the eNB rejects the RRC Connection Request message with RRC establishment cause "mo-data" or "delayTolerantAccess" as a RRC Connection Reject message), the eNB will reject all RRC Connection Requests initiated by the UE that supports CP CIoT EPS Optimization only and is configured as NAS signalling low priority. Consequently, there is a problem that all initial NAS procedures may fail.

(2) According to the discussion of (1), if "mo-data" only is used by the eNB for the overload control for CP data (i.e., if the eNB rejects only the RRC Connection Request message with RRC establishment cause "mo-data" as a RRC Connection Reject message), the UE that supports CP CIoT EPS Optimization only and is configured as NAS signalling low priority can skip the overload control for CP data at the eNB.

However, according to current 3GPP regulation, since the eNB is required not to perform RRC connection reject and to perform RRC connection release, the (1) above is inconsistent with the current 3GPP regulation.

More specifically, the RRC establishment cause is sent being included in RA message 3 (msg3) (i.e., RRC Connection Request message), and information about support of CP CIoT EPS optimization or support of UP CIoT EPS optimization or both is sent being included in RA message 5 (msg5) (i.e., RRC Connection Setup Complete message).

Thus, the eNB can comprehend the RRC establishment cause via the RA msg3 and can comprehend whether to support CP CIoT EPS optimization only via the RA msg5. Based on this, the eNB decides whether to apply the CP overload control. If applicable, the eNB sends including extendedWaitTime-CPdata timer in the RRC Connection Release message.

That is, the above-mentioned problem was described incorrectly due to lack of understanding of the technology.

Problem 1)

According to the existing operation of the NAS layer of the UE, the NAS layer of the UE passes request for the use of CIoT EPS optimization to lower layers as follows.

In the NB-S1 mode, when the UE requests the lower layers to establish a RRC connection and requests the use of EMM-REGISTERED without PDN connection or user plane CIoT EPS optimization, the UE passes an indication of the requested CIoT EPS optimization(s) to the lower layers. If the UE requests the use of S1-U data transfer without user plane CIoT optimization, the UE also passes an indication of user plane CIoT EPS optimization to lower layers.

In the WB-S1 mode, when the UE requests the lower layer to establish a RRC connection and requests the use of EMM-REGISTERED without PDN connection, control plane CIoT EPS optimization or user plane CIoT EPS optimization, the UE passes an indication of the requested CIoT EPS optimization(s) to the lower layers.

The above operations are performed during an Attach procedure or a TAU procedure as follows.

A UE supporting CIoT EPS optimizations can indicate the CIoT network behaviour the UE can support and prefer to use during the Attach or TAU procedure. The indication of preference is also considered as the request to use.

The UE may be in the NB-S1 mode or the WB-S1 mode when requesting the use of CIoT EPS optimizations during the Attach or TAU procedure.

Eventually, upon operation of the service request procedure, the UE does not pass CIoT EPS optimization related information to request the use to lower layers.

According to the CP overload control, the eNB distinguishes the following two messages (i.e., TAU Request with "signalling active" flag (this flag is set to '1' when the UE wants to use only EPS service using CP CIoT EPS optimization) and Control Plane Service Request on which an ESM Data Transport message is piggybacked), and should decide whether to apply the overload control.

The core network overload control for CP data is to restrict requests (i.e., TAU Request with "signalling active" flag and Control Plane Service Request on which an ESM Data Transport message is piggybacked) from UEs for data transmission via CP. Thus, other NAS signalling messages (e.g., Attach Request message, TAU request without "signalling active" flag) and services (e.g., SMS) are still allowed.

However, as described above, because upon the operation of the service request procedure, the UE does not pass CIoT EPS optimization related information to request the use to lower layers, there is a problem that the eNB cannot comprehend whether or not the UE is a UE supporting CP CIoT EPS Optimization only from CP service request on which the ESM Data Transport message is piggybacked. That is, according to the existing operation, there occurs a problem that the overload control for CP cannot be applied for the CP service request on which the ESM Data Transport message is piggybacked.

Problem 2)

According to the related art, during a TAU procedure, the NAS layer of the UE passes an indication of requesting the use of CIoT EPS optimization to lower layers. The AS layer of the UE (the RRC layer of the UE) receiving the indication includes the corresponding information in RA msg5 (RRC Connection Setup Complete message) and sends it to the eNB. As described above, the eNB determines whether to apply the overload control for CP based on information included in the RA msg5.

The overload control for CP is applied to the following two messages.

TAU Request with "signalling active" flag; and
Control Plane Service Request on which an ESM Data Transport message is piggybacked According to the existing operation, because upon the sending of the TAU request message, an indication of requesting the use of CIoT EPS optimization is passed to lower layers, and this information is passed to the eNB, the eNB can check whether the UE supports CP CIoT EPS optimization only. However, there exist several types of TAU request messages.

TAU request message without any flag
TAU request message with "active" flag
TAU request message with "signalling active" flag If the eNB receives an Overload Start message for CP from the MME, the eNB should apply the overload control for CP only to the TAU request message with "signalling active" flag among the TAU messages. However, because the existing operation of requesting the use of CIoT EPS optimization is applied to all the TAU request messages, there occurs a problem that the eNB cannot distinguish only the TAU request message with "signalling active" flag among all the TAU request messages.

In other words, the UE should perform the operation of requesting the use of CIoT EPS optimization for the MME selection upon the sending of the TAU request message. That is, because upon the sending of all the TAU request messages, an indication of requesting the use of CIoT EPS optimization should be passed to lower layers, there is a problem that the indication cannot use CP CIoT EPS optimization as a discriminator for distinguishing a TAU request message different from the TAU request message with "signalling active" flag.

To solve the above-described problems, the present disclosure proposes behaviours of the UE and the eNB for supporting the control plane overload control.

The following illustrates a relation mapping to terms used in the 5G system of the terms used in EPC.

eNB: gNB
MME (Mobility Management Entity): AMF (access and mobility management function) (or SMF (Session Management Function))
MME-EMM (EMM layer): AMF (5GMM (5G Mobility Management) layer)
MME-ESM (ESM layer): SMF (5GSM (5G Session Management) layer)
S-GW user plane function/P-GW user plane function: User Plane Function (UPF) (layer)
S1AP (interface/message): N2 (interface/message)
NAS (signalling connection/interface): N1 (connection/interface)

In the 5G system, MME-EMM is mapped to AMF, MME-ESM is mapped to SMF, the interface between MME-EMM and MME-AMF is mapped to N11, and the interface between MME-EMM and eNB is mapped to N2.

Accordingly, the description of the present disclosure can be equally applied to the 5G system in the same manner by replacing the description of the present disclosure according to the mapping relation described above.

Embodiment 1

In the above description about an initiation of a service request procedure for CP CIoT EPS optimization, cases where a NAS layer of a UE sends a Control Plane Service Request (CPSR) message are described. In clause 5.6.1.1 of TS 24.301, the following three cases among triggering conditions of the service request procedure are related to a case of sending the CPSR message:

a) when the UE in an EMM-IDLE mode receives a paging request with a CN domain indicator set to "PS" from the network;
b) when the UE in the EMM-IDLE mode has pending user data to be sent;
c) when the UE in the EMM-IDLE mode has uplink signalling pending;

The above a) is the case of a mobile terminated (MT) response. Since the CP overload control is applied only to mo-data and delaytolerantAccess, the case a) of the MT response has nothing to do with the CP overload control.

The type of CPSR in the above b) is divided into the following two cases.

If there is data to be transmitted to a control plane radio bearer, the CPSR includes an ESM message container IE with an ESM data transport message.
If there is data to be transmitted to a user plane radio bearer, the CPSR sets "active" flag of a control plane service type IE to 1 and does not include an ESM data transport message.

The type of CPSR in the above c) is divided into the following two cases.
- If SMS is transmitted, the CPSR includes a SMS message in a NAS message container IE and does not include an ESM message container IE.
- If signalling different from SMS is transmitted, the CPSR does not include an ESM data transport message and a NAS message container IE.

The UE's behaviour is described below.

[Method 1] Method of using a conventional request for the use of Control Plane CIoT EPS optimization Case A)

In the following case, the NAS layer of the UE passes an indication of requesting the use of Control Plane CIoT EPS optimization only to lower layers. That is, as an indication for indicating data transmission via control plane, an indication of requesting the use of Control Plane CIoT EPS optimization only may be used. In particular, only if the UE is a NB-IoT UE (i.e., the UE is a UE using NB-IoT RAT), an indication of requesting the use of Control Plane CIoT EPS optimization may be used as an indication for indicating data transmission via control plane.

- If there is data to be transmitted to a control plane radio bearer, the CPSR includes an ESM message container IE with an ESM data transport message.

In the above case, the request for the use of Control Plane CIoT EPS optimization only does not include a request for the use of User plane CIoT EPS optimization, and means to include only a request for the use of Control Plane CIoT EPS optimization.

Case B)

In the following case, the NAS layer of the UE does not pass an indication of requesting the use of Control Plane CIoT EPS optimization only to lower layers.

1. If there is data to be transmitted to a user plane radio bearer, the CPSR sets "active" flag of a control plane service type IE to 1 and does not include an ESM data transport message.

In this instance, the NAS layer of the UE can pass an indication of requesting the use of User plane CIoT EPS optimization only to lower layers.

2. If SMS is transmitted, the CPSR includes a SMS message in a NAS message container IE and does not include an ESM message container IE.

3. If signalling different from SMS is transmitted, the CPSR does not include an ESM data transport message and a NAS message container IE.

[Method 2]

As another example of implementing the Case A) or the Case B) described above, the following method may be considered.

[Method 2-1]

In the Case A) and the Case B) described above, the NAS layer of the UE can pass an indication (i.e., an indication for indicating data transfer via control plane) separate (different) from the existing indication of requesting the use of CIoT EPS optimization to lower layers.

If the AS layer of the UE (e.g., the RRC layer of the UE) receives the indication, the AS layer of the UE includes an indication separate (different) from 'the indication of requesting the use of CIoT EPS optimization' in RA msg5 (i.e., RRC Connection Setup Complete message) and sends it to the eNB.

In the Case A), the indication may be 'data transfer via Control Plane CIoT EPS Optimization' or 'CP data'. That is, the indication may correspond to an indication for indicating data transfer via control plane.

In the Case B-1), the indication may be 'data transfer via User Plane CIoT EPS Optimization' or 'UP data'. That is, the indication may correspond to an indication for indicating data transfer via user plane.

[Method 2-2]

The indication described in [Method 2-1] is another type of the conventional indication for CIoT EPS optimization and may be used being included in Msg5. That is, if the indication is 'Control plane CIoT EPS optimization', it may mean Control plane CIoT EPS optimization irrelevant to data transfer via control plane, and 'data transfer via Control Plane CIoT EPS Optimization' (i.e., an indication for indicating data transfer via control plane) may mean Control plane CIoT EPS optimization relevant to data transfer via control plane.

The UE's behaviour for supporting the above description is as follows.

If the NAS layer of the UE includes the ESM message container IE with the ESM data transport message in the CPSR (i.e., in the Case A), the NAS layer of the UE passes an indication of requesting the use of 'data transfer via Control Plane CIoT EPS Optimization (or CP data)' to lower layers.

If the NAS layer of the UE has data to be transmitted to a user plane radio bearer, the NAS layer of the UE passes an indication of requesting the use of 'data transfer via User Plane CIoT EPS Optimization (or UP data)' to lower layers if the CPSR sets "active" flag of a control plane service type IE to 1 (i.e., in the Case B-1).

The NAS layer of the UE passes an indication of requesting the use of 'Control plane CIoT EPS optimization' to lower layers, except as mentioned above in the CPSR transmissions.

The AS layer of the UE (e.g., the RRC layer of the UE) receiving the above-described indication includes a corresponding indication in RA msg5 (i.e., RRC Connection Setup Complete message) and sends it to the eNB.

The Method 1 described above can be applied as it is in the WB-S1 mode. However, Control plane CIoT EPS optimization is mandatory in the NB-S1 mode. Thus, the NAS layer of the UE does not pass a request for the use of Control Plane CIoT EPS Optimization to lower layers. Therefore, in order to apply the Method 1, even in the NB-S1 mode, the NAS layer of the UE passes an indication of requesting the use of Control Plane CIoT EPS optimization to lower layers, and the AS layer of the UE (e.g., the RRC layer of the UE) receiving this needs to enable an operation of adding this indication to RA msg5 (i.e., RRC Connection Setup Complete message).

The Method 2 can be applied as it is in the WB-S1 mode and the NB-S1 mode.

The eNB's behaviour is described below.

If the eNB receives from the MME an Overload Start message with overload control information about data transfer via CP CIoT EPS optimization, the eNB operates as follows if the eNB receives the indication described above.

When applying the Method 1:

the eNB does not accept a RRC Connection Request with RRC establishment cause "mo-data" or "delayTolerantAccess" from a UE supporting Control Plane CIoT EPS Optimization only.

In this case, the eNB includes extendedWaitTime-CPdata in a RRC Connection Release message and sends it to the UE. The AS layer of the UE (e.g., the RRC layer of the UE) receiving this passes corresponding extendedWaitTime-CPdata to the NAS layer of the UE. The NAS layer of the UE applies extendedWaitTime-CPdata to a timer T3446 (i.e., starts the timer T3446 with a value of extendedWaitTime-CPdata).

When applying the Method 2:

the eNB does not accept a RRC Connection Request with RRC establishment cause "mo-data" or "delayTolerantAccess" from a UE indicating 'data transfer via Control Plane CIoT EPS Optimization (or CP data)'.

In this case, the eNB includes extendedWaitTime-CPdata in a RRC Connection Release message and sends it to the UE. The AS layer of the UE (e.g., the RRC layer of the UE) receiving this passes corresponding extendedWaitTime-CPdata to the NAS layer of the UE. The NAS layer of the UE applies extendedWaitTime-CPdata to a timer T3446 (i.e., starts the timer T3446 with a value of extendedWaitTime-CPdata).

In the Method 2 described above, if the indication is included and used as another IE type of the conventional indication of CIoT EPS optimization (i.e., if the Method 2-1 is applied), the eNB additionally operates as follows.

If the eNB receives 'data transfer via Control Plane CIoT EPS Optimization (or CP data)' from the UE, it can be understood as the meaning of requesting the use of 'Control plane CIoT EPS optimization' represented by conventional 'Control Plane CIoT EPS Optimization' and the meaning of data transfer via Control plane CIoT EPS optimization. The meaning of the former may be used in MME selection as in the related art, and the meaning of the latter may be used in CP overload control application.

Embodiment 2

The UE's behaviour is described below.

If the UE sends a TAU Request message with 'signalling active' flag, the UE operates as follows.

[Method 1]

The NAS layer of the UE can pass an indication separate (different) from an 'indication of requesting the use of existing CIoT EPS optimization' to lower layers.

If the AS layer of the UE (e.g., the RRC layer of the UE) receives the indication (i.e., separate (different) indication), the AS layer of the UE includes the indication separate (different) from 'the indication of requesting the use of CIoT EPS optimization' in RA msg5 (i.e., RRC Connection Setup Complete message) and sends it to the eNB.

The indication (i.e., separate (different) indication) may be 'data transfer via Control Plane CIoT EPS Optimization' or 'CP data'.

[Method 2]

The indication described in the Method 1 is another type of the conventional indication for CIoT EPS optimization and may be used being included in Msg5. That is, if the indication is 'Control plane CIoT EPS optimization', it may mean control plane CIoT EPS optimization irrelevant to data transmission via control plane, and 'data transfer via Control Plane CIoT EPS Optimization' may mean control plane CIoT EPS optimization relevant to data transmission via control plane.

The UE's behaviour for supporting the above description is as follows.

If the NAS layer of the UE sends a TAU Request message with 'signalling active' flag, the NAS layer of the UE passes an indication of requesting the use of 'data transfer via Control Plane CIoT EPS Optimization (or CP data)' to lower layers.

Except as mentioned above in the TAU Request message transmission, the NAS layer of the UE passes an indication of a request for the use of 'Control Plane CIoT EPS Optimization (or CP data)' to lower layers.

The AS layer of the UE (e.g., the RRC layer of the UE) receiving the above-described indication includes a corresponding indication in RA msg5 (i.e., RRC Connection Setup Complete message) and sends it to the eNB.

In case of another TAU request message (i.e., TAU request message without any flag or TAU request message with 'active' flag), an operation related to the indication described above may not be performed. Alternatively, in case of the TAU request message with 'active' flag, an indication of 'data transfer via User Plane CIoT EPS Optimization' or 'UP data' may be used.

The eNB's behaviour is described below.

If the eNB receives from the MME an Overload Start message with overload control information about data transfer via CP CIoT EPS optimization, the eNB operates as follows if the eNB receives the indication described above.

[Commonness of Method 1 and Method 2]

The eNB does not accept a RRC Connection Request with RRC establishment cause "mo-data" or "delayTolerantAccess" from a UE indicating 'data transfer via Control Plane CIoT EPS Optimization (or CP data)'.

In this case, the eNB includes extendedWaitTime-CPdata in a RRC Connection Release message and sends it to the UE. The AS layer of the UE (e.g., the RRC layer of the UE) receiving this passes corresponding extendedWaitTime-CPdata to the NAS layer of the UE. The NAS layer of the UE applies extendedWaitTime-CPdata to a timer T3446 (i.e., starts the timer T3446 with a value of extendedWaitTime-CPdata).

If the above indication is included and used as another IE type of the conventional indication of CIoT EPS optimization (i.e., if the Method 2 is applied), the eNB additionally operates as follows.

If the eNB receives 'data transfer via Control Plane CIoT EPS Optimization (or CP data)' from the UE, it can be understood as the meaning of requesting the use of Control plane CIoT EPS optimization represented by conventional 'Control Plane CIoT EPS Optimization' and the meaning of data transfer via Control plane CIoT EPS optimization. The meaning of the former may be used in MME selection as in the related art, and the meaning of the latter may be used in CP overload control application.

FIG. 10 illustrates an overload control method according to an embodiment of the present disclosure.

Referring to FIG. 10, a base station receives from a core network (e.g., MME or AMF or SMF) an overload start message in S1001.

Here, the overload start message may be used to inform that an overload start (control) procedure has started to reduce the signalling load toward the corresponding core network.

The base station receives from a UE a first RRC message in S1002.

Here, the first RRC message may be a RRC Connection Setup Complete message.

Further, the first RRC message may include a NAS message and/or an indication for indicating a data transmission via a control plane.

As described above, the indication may use an indication of requesting the use of Control Plane CIoT EPS optimization only as described in the Method 1 of the Embodiment 1. In particular, only if the UE is a NB-IoT UE (i.e., the UE is a UE using NB-IoT RAT), an indication of requesting the use of Control Plane CIoT EPS optimization only may be used as an indication for indicating data transmission via control plane.

Further, an indication different (separate) from the indication of requesting the use of Control Plane CIoT EPS optimization may be used as described in the Method 2 of the Embodiment 1 and the Embodiment 2. If the indication described in the Method 2-2 of the Embodiment 1 and the Method 2 of the Embodiment 2 is used, the indication may be considered as a request for the use of Control Plane CIoT EPS optimization and a data transfer via Control Plane CIoT EPS optimization.

The above indication may be included in the first RRC message only when the UE uses CP CIoT EPS optimization only.

The NAS message included in the first RRC message may be a Control Plane Service Request message with MO data. That is, the NAS message may be a Control Plane Service Request message with an ESM message container IE to be sent by piggybacking an ESM data transport message (MO data). Alternatively, the NAS message included in the first RRC message may be a TAU Request message with signaling active flag.

If the first RRC message includes an indication indicating the data transmission via control plane, the base station sends to the UE a RRC connection release message for commanding a release of a RRC connection in S1003.

Here, the RRC connection release message may include a wait time (e.g., extendedWaitTime-CPdata) for a user data access via the control plane.

The UE receiving this may apply the wait time to a back-off timer (i.e., the UE may start the back-off timer with the received wait time).

When an IE (e.g., an Overload Action IE in an Overload Response IE) in the overload start message received by the base station has been set not to accept a RRC connection request for data transmission from a UE supporting CP CIoT EPS Optimization only (i.e., not to accept a traffic corresponding to RRC cause "mo-data" or "mo-signaling" or "delayTolerantAccess"), an overload control operation can be performed.

The base station can receive from the UE a second RRC message with RRC establishment cause of mobile originated (MO) data or mo-signalling or delayTolerantAccess before receiving the first RRC message, and receive the first RRC message with the above-described indication. Here, the second RRC message may be a RRC connection request message. If the base station receives the second RRC message with the above-described RRC establishment cause and receives the first RRC message with the above-described indication, the base station can send a RRC connection release message to the UE.

FIG. 11 illustrates an overload control method according to an embodiment of the present disclosure.

Referring to FIG. 11, a NAS layer of a UE passes an indication for indicating a data transmission via a control plane and a NAS message to an AS layer of the UE in S1101.

As described above, the indication may use an indication of requesting the use of Control Plane CIoT EPS optimization only as described in the Method 1 of the Embodiment 1. In particular, only if the UE is a NB-IoT UE (i.e., the UE is a UE using NB-IoT RAT), an indication of requesting the use of Control Plane CIoT EPS optimization only may be used as an indication for indicating data transmission via control plane.

Further, an indication different (separate) from the indication of requesting the use of Control Plane CIoT EPS optimization may be used as described in the Method 2 of the Embodiment 1 and the Embodiment 2. If the indication described in the Method 2-2 of the Embodiment 1 and the Method 2 of the Embodiment 2 is used, the indication may be considered as a request for the use of Control Plane CIoT EPS optimization and a data transfer via Control Plane CIoT EPS optimization.

The above indication may be included in the first RRC message only when the UE uses CP CIoT EPS optimization only.

The NAS message included in the first RRC message may be a Control Plane Service Request message with MO data. That is, the NAS message may be a Control Plane Service Request message with an ESM message container IE to be sent by piggybacking an ESM data transport message (MO data). Alternatively, the NAS message included in the first RRC message may be a TAU Request message with signaling active flag.

The AS layer of the UE sends a first RRC message including the indication and the NAS message to the base station in S1102.

Here, the first RRC message may be a RRC Connection Setup Complete message.

If the AS layer of the UE receives from the base station a RRC connection release message with a wait time for a user data access via the control plane in S1103, the AS layer of the UE passes the wait time to the NAS layer in S1104.

The NAS layer of the UE applies the wait time to a back-off timer (i.e., the NAS layer starts the back-off timer with the received wait time) in S1105.

When an IE (e.g., an Overload Action IE in an Overload Response IE) in an overload start message that the base station receives from the core network has been set not to accept a RRC connection request for data transmission from a UE supporting CP CIoT EPS Optimization only (i.e., not to accept a traffic corresponding to RRC cause "mo-data" or "mo-signaling" or "delayTolerantAccess"), an overload control operation can be performed.

The AS layer of the UE can send to the base station a second RRC message with RRC establishment cause of mobile originated (MO) data or mo-signalling or delayTolerantAccess before sending the first RRC message, and send the first RRC message with the above-described indication. Here, the second RRC message may be a RRC connection request message. In this case, if the base station receives the second RRC message with the above-described RRC establishment cause and receives the first RRC message with the above-described indication, the base station can send a RRC connection release message to the UE.

Overview of Device to which the Present Disclosure is Applicable

FIG. 12 illustrates a block configuration diagram of a communication device according to an embodiment of the present disclosure.

Referring to FIG. 12, a wireless communication system includes a network node 1210 and a plurality of UEs 1220.

The network node 1210 includes a processor 1211, a memory 1212, and a communication module 1213. The processor 1211 implements functions, processes, and/or methods proposed in FIGS. 1 to 11. Layers of wired/wireless interface protocol may be implemented by the processor 1211.

The memory 1212 is connected to the processor 1211 and stores various types of information for driving the processor 1211. The communication module 1213 is connected to the processor 1211 and transmits and/or receives wired/wireless signals. An example of the network node 1210 may correspond to a base station, MME, AMF, SMF, or the like. In particular, if the network node 1210 is the base station, the communication module 1213 may include a radio frequency (RF) unit for transmitting/receiving a radio signal.

The UE 1220 includes a processor 1221, a memory 1222, and a communication module (or RF unit) 1223. The processor 1221 implements functions, processes, and/or methods proposed in FIGS. 1 to 11. Layers of a radio interface protocol may be implemented by the processor 1221. In particular, the processor may include a NAS layer and an AS layer. The memory 1222 is connected to the processor 1221 and stores various types of information for driving the processor 1221. The communication module 1223 is connected to the processor 1221 and transmits and/or receives a radio signal.

The memories 1212 and 1222 may be inside or outside the processors 1211 and 1221 and may be connected to the processors 1211 and 1221 through various well-known means. Further, the network node 1210 (in case of the base station) and/or the UE 1220 may have a single antenna or multiple antennas.

FIG. 13 illustrates a block configuration diagram of a communication device according to an embodiment of the present disclosure.

In particular, FIG. 13 illustrates in more detail the UE illustrated in FIG. 12.

Referring to FIG. 13, the UE may include a processor (or digital signal processor (DSP)) 1310, an RF module (or RF unit) 1335, a power management module 1305, an antenna 1340, a battery 1355, a display 1315, a keypad 1320, a memory 1330, a subscriber identification module (SIM) card 1325 (which is optional), a speaker 1345, and a microphone 1350. The UE may also include a single antenna or multiple antennas.

The processor 1310 implements functions, processes, and/or methods proposed in FIGS. 1 to 11. Layers of a radio interface protocol may be implemented by the processor 1310.

The memory 1330 is connected to the processor 1310 and stores information related to operations of the processor 1310. The memory 1330 may be inside or outside the processor 1310 and may be connected to the processors 1310 through various well-known means.

A user inputs instructional information, such as a telephone number, for example, by pushing (or touching) buttons of the keypad 1320 or by voice activation using the microphone 1350. The processor 1310 receives and processes the instructional information to perform an appropriate function, such as to dial the telephone number. Operational data may be extracted from the SIM card 1325 or the memory 1330. Further, the processor 1310 may display instructional information or operational information on the display 1315 for the user's reference and convenience.

The RF module 1335 is connected to the processor 1310 and transmits and/or receives an RF signal. The processor 1310 forwards instructional information to the RF module 1335 in order to initiate communication, for example, transmit a radio signal configuring voice communication data. The RF module 1335 includes a receiver and a transmitter to receive and transmit the radio signal. The antenna 1340 functions to transmit and receive the radio signal. Upon reception of the radio signal, the RF module 1335 may transfer a signal to be processed by the processor 1310 and convert the signal into a baseband. The processed signal may be converted into audible or readable information output via the speaker 1345.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although the present disclosure has been described focusing on examples applying to the 3GPP LTE/LTE-A system, it can be applied to various wireless communication systems, for example, the fifth generation (5G) system other than the 3GPP LTE/LTE-A system.

The invention claimed is:

1. A method for performing, by a base station, an overload control in a wireless communication system, the method comprising:
receiving from a core network an overload start message;
determining whether to apply an overload control for a control plane (CP); and
based the overload control for the CP being determined to apply, transmitting, to a user equipment (UE), a RRC connection release message for commanding a release of a RRC connection;

wherein determining whether to apply the overload control for the CP comprises:
based on the overload control for the CP being performed during a service request procedure:
receiving, from the UE, a radio resource control (RRC) message with a Control Plane Service Request (CPSR) message,
wherein the RRC message with the CPSR message includes (i) first information representing that the UE supports only CP Cellular Internet of Things (IoT) (CIoT) evolved packet system (EPS) optimization or (ii) second information representing a data transmission via the CP CIoT EPS optimization, and
wherein a decision as to whether to apply the overload control for the CP is determined based on (i) the first information or (ii) the second information,
based on the overload control being performed during a tracking area update (TAU) procedure:
receiving, from the UE, a RRC message with a TAU request message,
wherein the RRC message with the TAU request message includes third information representing the data transmission via the CP CIoT EPS optimization based on the TAU request message being a TAU request message with signalling active flag, and
wherein a decision as to whether to apply the overload control for the CP is determined based on the third information.

2. The method of claim 1, further comprising:
receiving from the UE a RRC message with a RRC establishment cause,
wherein the RRC establishment cause is mobile originated (MO) data or mo-signalling or delayTolerantAccess data.

3. The method of claim 1, wherein the RRC connection release message includes a wait time for a user data access via the control plane.

4. The method of claim 1, wherein, based on the RRC message with the CPSR message including the second information, the RRC message with the CPSR message further includes information representing use of the CP CIoT EPS optimization.

5. The method of claim 4, wherein based on the UE being a UE using narrowband (NB)-IoT radio access technology (RAT), the indication of requesting the use of the CIoT EPS optimization is used.

6. The method of claim 4, wherein, based on the RRC message with the CPSR message including the second information, the second information is considered as the CP CIoT EPS optimization related to a data transmission via the CP.

7. The method of claim 6, wherein, based on the RRC message with the CPSR message including information representing the CP CIoT EPS optimization, the information representing the CP CIoT EPS optimization is considered as the CP CIoT EPS optimization unrelated to the data transmission via the CP.

8. A method for operating a user equipment (UE) for an overload control in a wireless communication system, the method comprising:
based on the overload control for a control plane (CP) being determined to apply, transmitting, from a base station, a RRC connection release message for commanding a release of a RRC connection;
based on the overload control for the CP being performed during a service request procedure, further comprising:
transmitting, to the base station, a radio resource control (RRC) message with a Control Plane Service Request (CPSR) message,
wherein the RRC message with the CPSR message includes (i) first information representing that the UE supports only CP Cellular Internet of Things (IoT) (CIoT) evolved packet system (EPS) optimization or (ii) second information representing a data transmission via the CP CIoT EPS optimization, and
wherein a decision as to whether to apply the overload control for the CP is determined based on (i) the first information or (ii) the second information,
based on the overload control being performed during a tracking area update (TAU) procedure further comprising:
transmitting, to the base station, a RRC message with a TAU request message,
wherein the RRC message with the TAU request message includes third information representing the data transmission via the CP CIoT EPS optimization based on the TAU request message being a TAU request message with signalling active flag, and
wherein a decision as to whether to apply the overload control for the CP is determined based on the third information.

9. The method of claim 8, further comprising:
transmitting, to the base station, a RRC message with a RRC establishment cause to the base station,
wherein the RRC establishment cause is mobile originated (MO) data or delayTolerantAccess data.

10. The method of claim 8, wherein the RRC connection release message includes a wait time for a user data access via the control plane.

11. The method of claim 8, wherein, based on the RRC message with the CPSR message including the second information, the RRC message with the CPSR message further includes information representing use of the CP CIoT EPS optimization.

12. The method of claim 11, wherein based on the UE being a UE using narrowband (NB)-IoT radio access technology (RAT), the indication of requesting the use of the CIoT EPS optimization is used.

13. The method of claim 11, wherein, based on the RRC message with the CPSR message including the second information, the second information is considered as the CP CIoT EPS optimization related to a data transmission via the CP.

14. The method of claim 13, wherein, based on the RRC message with the CPSR message including information representing the CP CIoT EPS optimization, the information representing the CP CIoT EPS optimization is considered as the CP CIoT EPS optimization unrelated to the data transmission via the CP.

* * * * *